United States Patent
Yagi et al.

(10) Patent No.: US 11,217,939 B2
(45) Date of Patent: Jan. 4, 2022

(54) POWER CIRCUIT SHUT OFF DEVICE

(71) Applicant: Yazaki Corporation, Tokyo (JP)

(72) Inventors: Shintaro Yagi, Kakegawa (JP); Osamu Furugoori, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/890,144

(22) Filed: Jun. 2, 2020

(65) Prior Publication Data

US 2020/0388960 A1 Dec. 10, 2020

(30) Foreign Application Priority Data

Jun. 6, 2019 (JP) .............................. JP2019-106304
Mar. 3, 2020 (JP) .............................. JP2020-035981

(51) Int. Cl.
| | |
|---|---|
| *H01H 9/32* | (2006.01) |
| *H01R 13/629* | (2006.01) |
| *H01H 21/22* | (2006.01) |
| *H01R 13/639* | (2006.01) |
| *H01R 13/70* | (2006.01) |
| *H01H 1/20* | (2006.01) |
| *H01H 27/04* | (2006.01) |

(52) U.S. Cl.
CPC ......... *H01R 13/62938* (2013.01); *H01H 1/20* (2013.01); *H01H 9/32* (2013.01); *H01H 21/22* (2013.01); *H01H 27/04* (2013.01); *H01R 13/639* (2013.01); *H01R 13/701* (2013.01); *H01R 2201/26* (2013.01)

(58) Field of Classification Search
None
See application file for complete search history.

(56) References Cited

U.S. PATENT DOCUMENTS 2,128,999 A * 9/1938 Frank ....................... H01H 9/32
218/117
3,944,760 A * 3/1976 Zdanys ................ H01H 15/005
200/6 BB (Continued)

FOREIGN PATENT DOCUMENTS

| JP | 2012-243559 A | 12/2012 |
| WO | 2015058501 A1 | 4/2015 |

OTHER PUBLICATIONS

Communication dated Nov. 6, 2020 from the European Patent Office in application No. 20178147.3.

*Primary Examiner* — Felix O Figueroa
(74) *Attorney, Agent, or Firm* — Sughrue Mion, PLLC

(57) ABSTRACT

A power circuit shut off device includes a housing and a switch portion provided in the housing, and an operating member configured to turn on or turns off the switch portion. The switch portion includes a pair of terminals arranged along a bottom face of the housing, an electric conductive member having contact point portions and that is elastically urged toward the pair of terminals, and an insulating movable member configured to move along a direction in which the pair of terminals are arranged. The pair of terminals are brought into electric conductive to each other when the pair of terminals contact the contact point portions respectively. The insulating movable member is moved between a shut-off position and a conductive position by an operation on the operating member.

7 Claims, 12 Drawing Sheets

(56) References Cited

U.S. PATENT DOCUMENTS

| | | | | |
|---|---|---|---|---|
| 4,429,201 A | * | 1/1984 | Dekkers | H01H 15/005 200/284 |
| 4,609,795 A | * | 9/1986 | Lavigne | H01H 5/045 200/288 |
| 6,982,393 B2 | * | 1/2006 | Matsui | H01R 13/62933 200/335 |
| 8,986,024 B2 | * | 3/2015 | Ikeda | H01R 13/62938 439/157 |
| 2005/0098419 A1 | | 5/2005 | Matsui et al. | |

* cited by examiner

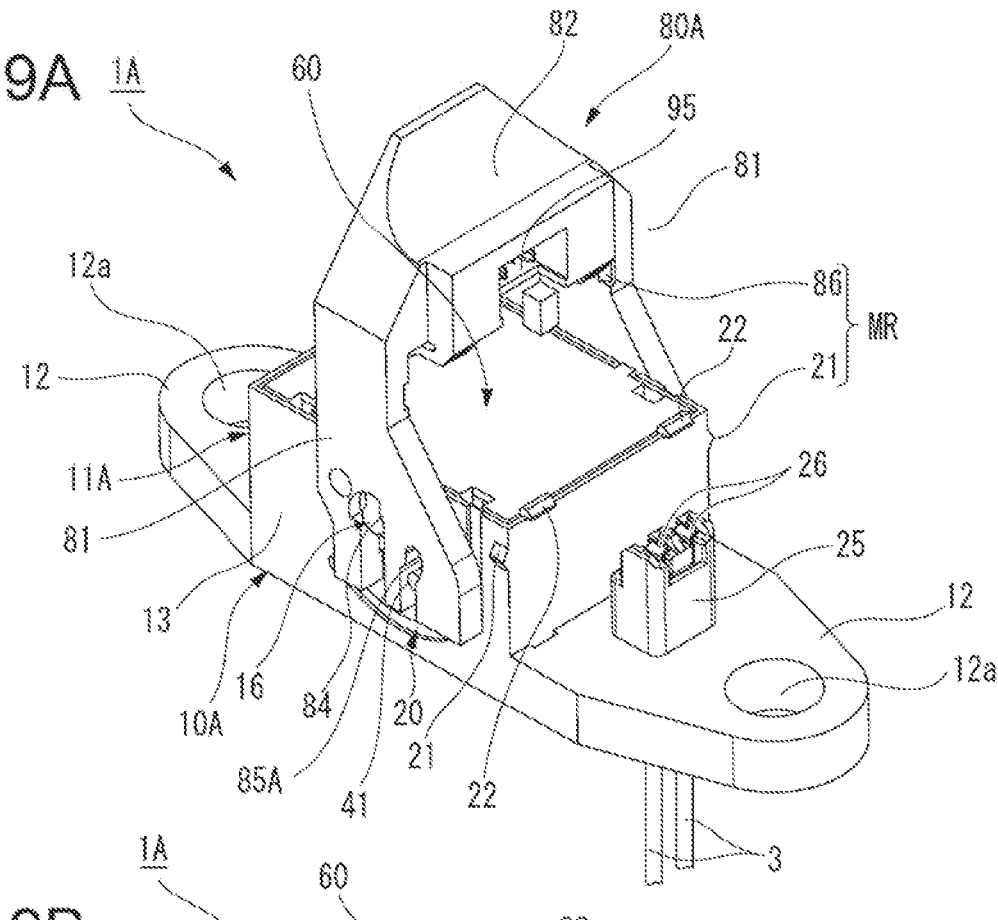
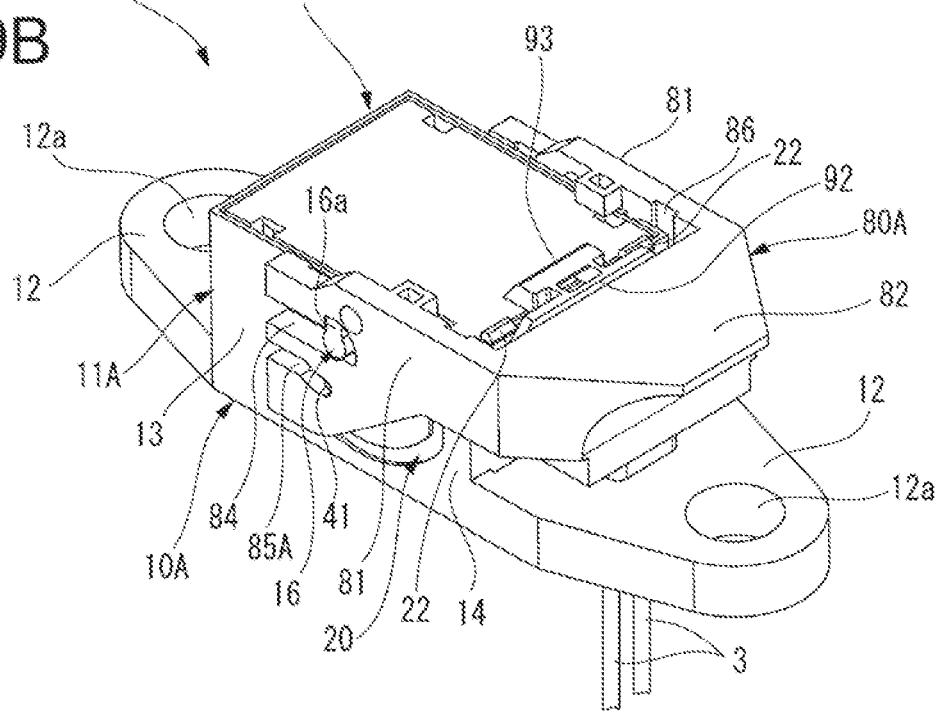

POWER CIRCUIT SHUT OFF DEVICE

CROSS REFERENCE TO RELATED APPLICATIONS

This application is based on Japanese Patent Application (No. 2019-106304) filed on Jun. 6, 2019 and Japanese Patent Application (No. 2020-035981) filed on Mar. 3, 2020, the contents of which are incorporated herein by reference.

BACKGROUND OF THE INVENTION

1. Field of the Invention

The present invention relates to a power circuit shut off device.

2. Description of the Related Art

In a vehicle such as an electric car or a hybrid car, a power circuit shut off device called a service plug for shutting off electric conduction between a power supply and a load is provided in order to secure operating safety during maintenance or the like of an electric system.

Such a power circuit shut off device has a first housing and a second housing removably attached to the first housing. For example, in some power circuit shut off device, a power supply switch is constituted by a female terminal provided in the first housing and a male terminal provided in the second housing (for example, see JP-A-2012-243559).

In the power circuit shut off device, when the second housing is attached to or detached from the first housing, the male terminal is inserted to or extracted from the female terminal to thereby turn on or off the power supply switch.

In the aforementioned power circuit shut off device, whenever the second housing is attached to or detached from the first housing, the male terminal is inserted to or extracted from the female terminal so that contact point portions of the terminals slide on each other. When the attachment/detachment operation of the second housing to/from the first housing is repeated, there is a fear that the surfaces of the contact point portions sliding on each other in the female terminal and the male terminal may be shaved. In addition, there is a fear that plating applied to the surface of each terminal may be shaved to exposure a substrate part of the terminal so that the exposed part may be oxidized to increase electric resistance to thereby lower the reliability.

In addition, the aforementioned power circuit shut off device has a structure in which the second housing moves in a vertical direction relatively to the first housing to be thereby fitted to and separated from the first housing so that the terminals contact and separate each other. Therefore, the second housing requires a moving stroke in the vertical direction to thereby increase the height of the power circuit shut off device.

SUMMARY OF INVENTION

The present invention has been developed in consideration of the aforementioned situation. An object of the present invention is to provide a power circuit shut off device capable of keeping high reliability in connection between terminals electrically connected to each other, and capable of reducing the size and height of the power circuit shut off device while suppressing the cost.

The aforementioned object of the present invention is attained by the following configurations.

(1) A power circuit shut off device including: a housing; a switch portion that is provided in the housing; and an operating member configured to turn on or turn off the switch portion; the switch portion including: a pair of terminals arranged along a bottom face of the housing; an electric conductive member having contact point portions and that is elastically urged toward the pair of terminals, wherein the pair of terminals are brought into electric conductive to each other when the pair of terminals contact the contact point portions respectively; and an insulating movable member configured to move along a direction in which the pair of terminals are arranged, and that is made of insulating material; in which the insulating movable member is moved between a shut-off position and a conductive position by an operation on the operating member, the insulating movable member in the shut-off position being put between the contact point portions of the electric conductive member and the terminals so as to turn off the switch portion, and the insulating movable member in the conductive position being released from between the contact point portions of the electric conductive member and the terminals so as to turn on the switch portion.

According to the power circuit shut off device having the aforementioned configuration (1), the insulating movable member is moved by the operating member so that the insulating movable member is inserted or extracted between the contact point portions of the terminals and the electric conductive member touching each other to thereby turn or turn off the switch portion. The insulating movable member inserted or extracted between the contact point portions of the terminals and the electric conductive member is made of an insulating member such as synthetic resin lower in hardness than the terminals or the electric conductive member. Therefore, damage given to the terminals or the electric conductive member when the insulating movable member is inserted/extracted between the contact point portions of the terminals and the electric conductive member can be suppressed to be as small as possible. Thus, the surfaces of the terminals and the electric conductive member can be suppressed from being shaved, and generation of shaved metal powder can be suppressed, in comparison with a case where contact points of terminals made of electrically conductive metal materials or the like slide on each other. Particularly when the surfaces of the terminals and the electric conductive member are subjected to a plating treatment, there can be inhibited such a problem that the plating is separated to expose a substrate, and the substrate is oxidized to increase electric resistance. Thus, the switch portion turning on/off the circuit can be inhibited from deteriorating, so that high reliability can be kept.

In addition, the power circuit shut off device having the configuration has a structure in which the insulating movable member is moved in the direction in which the terminals are arranged along the bottom face of the housing, so that the switch portion is turned on/off. Accordingly, the power circuit shut off device according to the present invention can be made smaller in size and lower in height than a power circuit shut off device having a background-art structure in which a first housing and a second housing move relatively to each other in a vertical direction so as to be fitted to and separated from each other to thereby turn on and off a switch portion.

(2) The power circuit shut off device according to the aforementioned configuration (1), wherein: the switch portion is received in a reception space sectionally formed and surrounded by the housing.

According to the power circuit shut off device having the aforementioned configuration (2), the switch portion is received in the reception space sectionally formed and surrounded by the housing. Therefore, a user is inhibited from touching the terminals or the electric conductive member which are conductive parts, so that safety can be secured. In this manner, in the power circuit shut off device having the configuration, a structure for preventing a finger from touching the conductive parts can be dispensed with. Thus, the power circuit shut off device having the configuration can be made lower in cost and smaller in size due to its simplified structure than a power circuit shut off device having a background-art structure in which a second housing is fitted to and separated from a first housing to thereby turn on and off a switch portion.

(3) The power circuit shut off device according to the aforementioned configuration (1) or (2), further including: a sub-switch portion that is turned on together with the switch portion in a conductive state in which the insulating movable member is disposed in the conductive position, and turned off to shut off electric conduction to a circuit for the switch portion in a temporary shut-off state in which the switch portion is kept on when the insulating movable member is being displaced toward the shut-off position.

According to the power circuit shut off device having the aforementioned configuration (3), when the insulating movable member is being displaced from the conductive position to the shut-off position, the sub-switch portion is turned off to shut off electric conduction to a circuit for the switch portion while the switch portion is still turned on. Therefore, the timing when the switch portion is turned off can be delayed relatively to the sub-switch portion, so that an arc, a spark, etc. can be inhibited from being generated by a residual current in the circuit.

(4) The power circuit shut off device according to any one of the aforementioned (1) to (3), wherein: contact faces of the terminals and the electric conductive member are covered with the insulating movable member disposed in the shut-off position.

According to the power circuit shut off device having the aforementioned configuration (4), the contact faces in the contact point portions of the terminals and the electric conductive member are covered with the insulating movable member in the shut-off state. Therefore, the contact faces in the contact point portions in the shut-off state are inhibited from being exposed, so that formation of an oxide coating or corrosion in the contact faces can be inhibited, in comparison with a background-art structure in which terminals and an electric conductive member are moved relatively to touch each other or leave each other. Thus, the reliability of the switch portion can be enhanced.

(5) The power circuit shut off device according to any one of the aforementioned configurations (1) to (4), wherein: the operating member includes a lever that is rotatably attached to the housing; and the insulating movable member is moved by rotating force of the lever.

According to the power circuit shut off device having the aforementioned configuration (5), the insulating movable member can be moved easily with light operation force when the lever is rotated. Thus, the power circuit shut off device more excellent in operability can be provided.

(6) The power circuit shut off device according to the aforementioned configuration (5), further including: a lever detachment preventing mechanism that is provided between the lever and the housing so as to permit the lever to leave the housing only in a shut-off operation position of the lever corresponding to the shut-off position.

According to the power circuit shut off device having the aforementioned configuration (6), the lever detachment preventing mechanism that permits the lever to leave the housing only in the shut-off operation position is provided. Therefore, the lever rotated between the shut-off operation position and a conductive operation position relatively to the housing can be attached to and detached from the housing. Thus, in the shut-off operation position, only the lever can leave the housing while the terminals and the electric conductive member are still covered with the housing. Thus, a structure provided in the first housing in the background-art power circuit shut off device in order to prevent a finger from touching the female terminal of the first housing exposed when the second housing is detached can be dispensed with. In addition, there is no fear that the lever may be detached unintentionally during rotational operation in any other position than the shut-off operation position.

(7) The power circuit shut off device according to the aforementioned configuration (6), the lever detachment preventing mechanism including: a guide protrusion that is provided in one of the lever and the housing; and a guide groove that is provided in the other of the lever and the housing so that the guide groove can engage with the guide protrusion to permit the lever to leave the housing only in the shut-off operation position.

According to the power circuit shut off device having the aforementioned configuration (7), the lever detachment preventing mechanism can be constituted by the simple structure in which the guide protrusion and the guide groove corresponding to a moving locus of the guide protrusion (an attachment/detachment locus and a rotating locus of the lever) are provided in the lever and the housing respectively.

According to the present invention, it is possible to provide a power circuit shut off device capable of keeping high reliability in connection between terminals electrically connected to each other, and capable of reducing the size and height of the power circuit shut off device while suppressing the cost.

The present invention has been described briefly above. The further details of the invention will be made clearer if the following mode for carrying out the Invention (hereinafter referred to as "embodiment") is read through with reference to the accompanying drawings.

BRIEF DESCRIPTION OF DRAWINGS

FIGS. 9A and 9B are views showing a power circuit shut off device according to a second embodiment of the present invention, FIG. 9A being a perspective view in a shut-off state, FIG. 9B being a perspective view in a conductive state;

DETAILED DESCRIPTION OF THE EXEMPLARY EMBODIMENTS

Embodiments of the present invention will be described below with reference to the drawings.

Figure 1A:
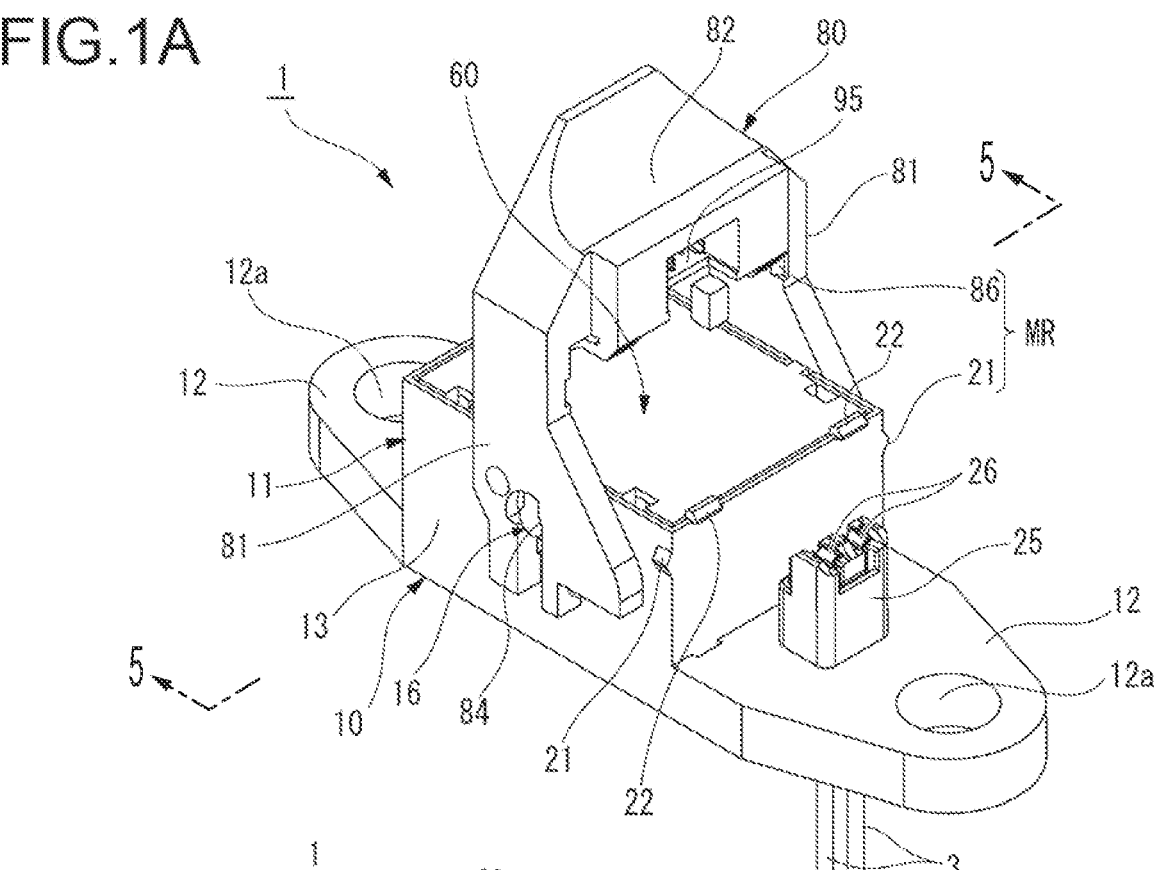
FIGS. 1A and 1B are views showing a power circuit shut off device according to a first embodiment of the present invention, FIG. 1A being a perspective view in a shut-off state, FIG. 1B being a perspective view in a conductive state.
Figure 1B:
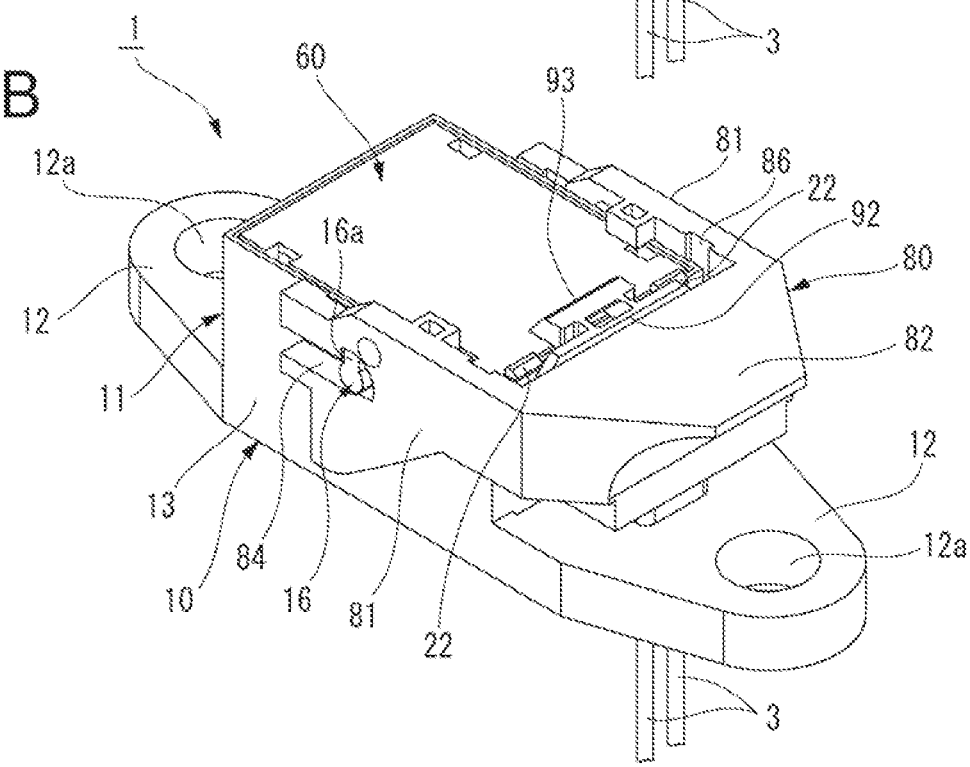
Figure 2:
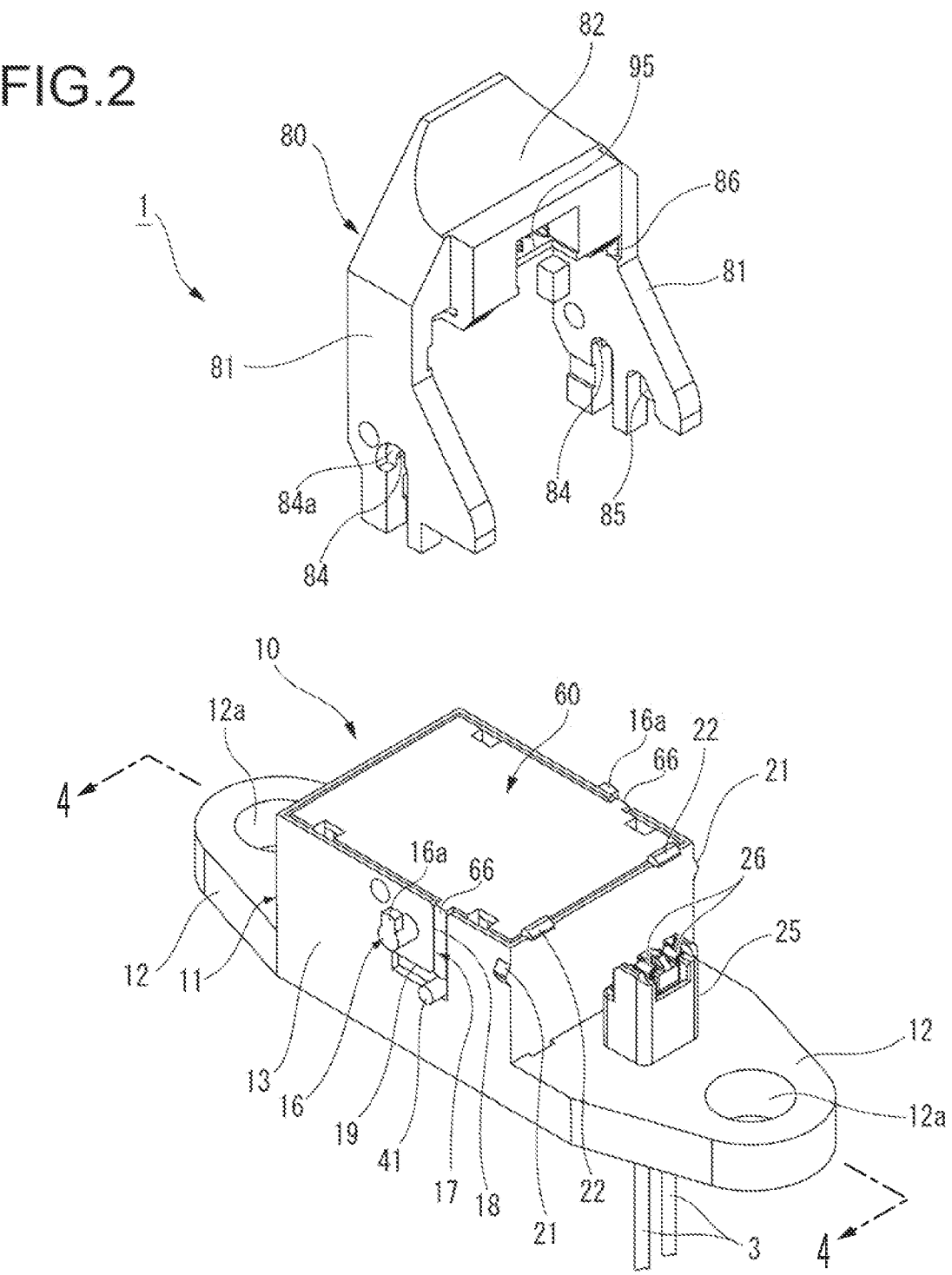
FIG. 2 is a perspective view showing a state in which a lever has been removed from a housing in the power circuit shut off device in the shut-off state shown in FIG. 1A.

FIGS. 1A and 1B are views showing a power circuit shut off device 1 according to a first embodiment of the present invention. FIG. 1A is a perspective view in a shut-off state, and FIG. 1B is a perspective view in a conductive state. FIG. 2 is a perspective view showing a state in which a lever 80 has been removed from a housing 10 in the power circuit shut off device 1 in the shut-off state.

As shown in FIGS. 1A and 1B and FIG. 2, the power circuit shut off device according to the first embodiment includes the housing 10 and the lever (operating member) 80. The lever 80 can be rotated relatively to the housing 10. The lever 80 is rotated between a shut-off operation position (the position of FIG. 1A) and a conductive operation position (the position of FIG. 1B) relatively to the housing 10. In addition, the lever 80 can be removably attached to the housing 10 in a state where the lever 80 is disposed in the shut-off operation position.

The power circuit shut off device 1 according to the first embodiment is a so-called service plug which can shut off electric conduction between a power supply portion and a load in order to secure operating safety during maintenance of an electric system or the like in a vehicle such as an electric car or a hybrid car. Specifically when the lever 80 is disposed in the conductive operation position relatively to the housing 10, electric conduction can be established between the power supply portion and the load. When the lever 80 is disposed in the shut-off operation position relatively to the housing 10, the electric conduction between the power supply portion and the load can be shut off. When the lever 80 disposed in the shut-off operation position is removed from the housing 10, the shut-off state between the power supply portion and the load can be kept.

Figure 3:
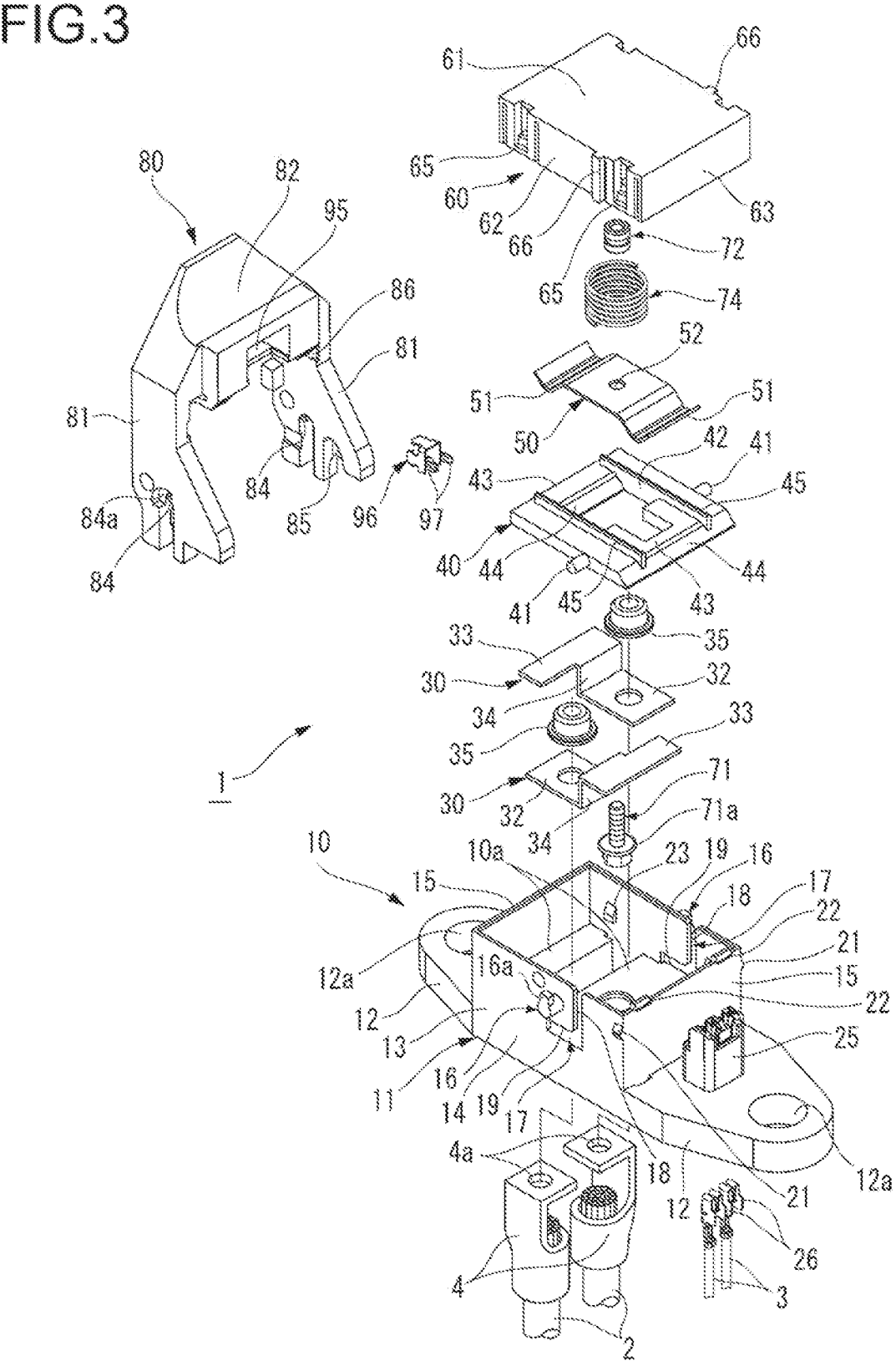
FIG. 3 is an exploded perspective view of the power circuit shut off device according to the first embodiment.
Figure 4:
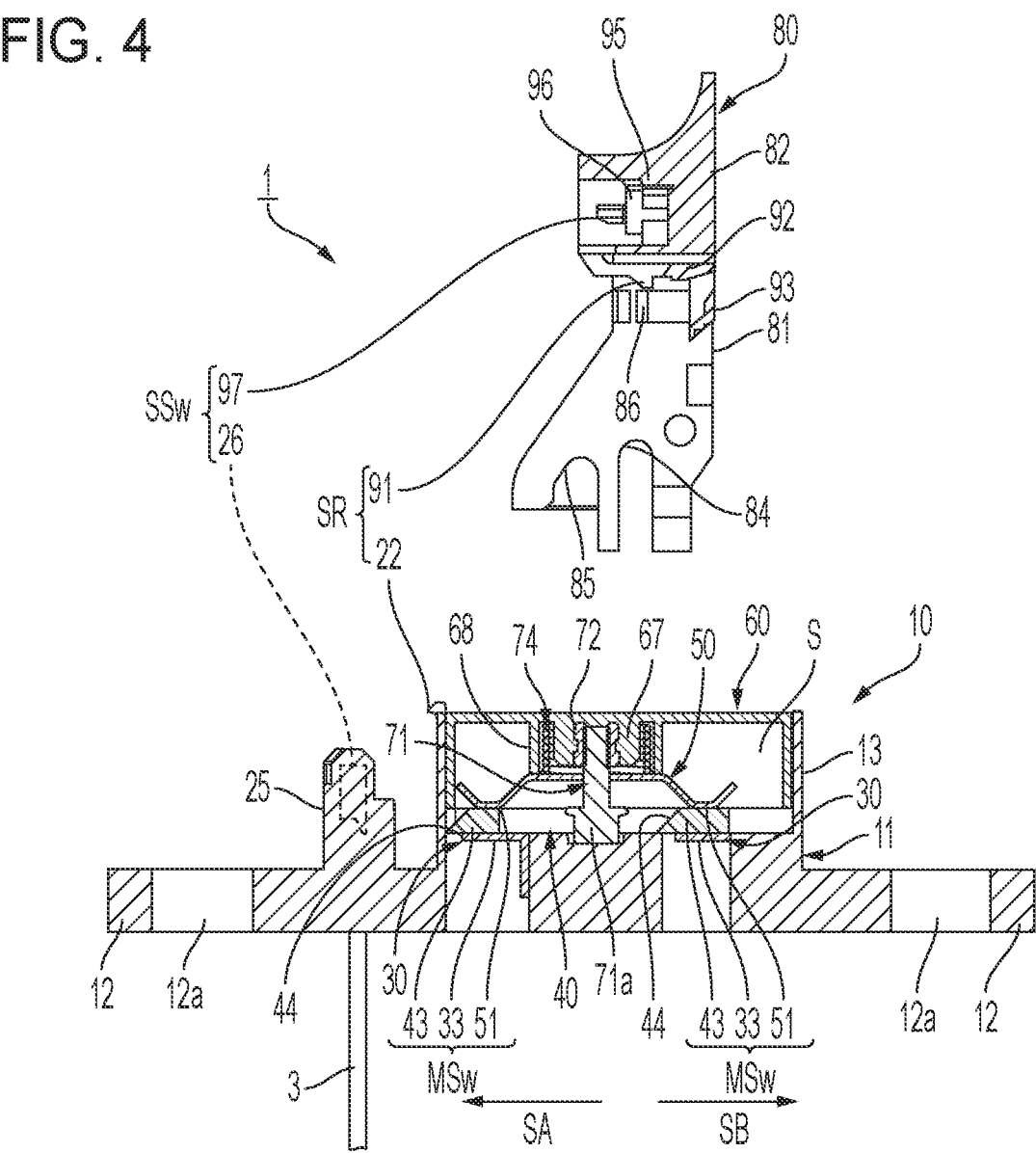
FIG. 4 is a sectional view taken on line A-A in FIG. 2.
Figure 5:
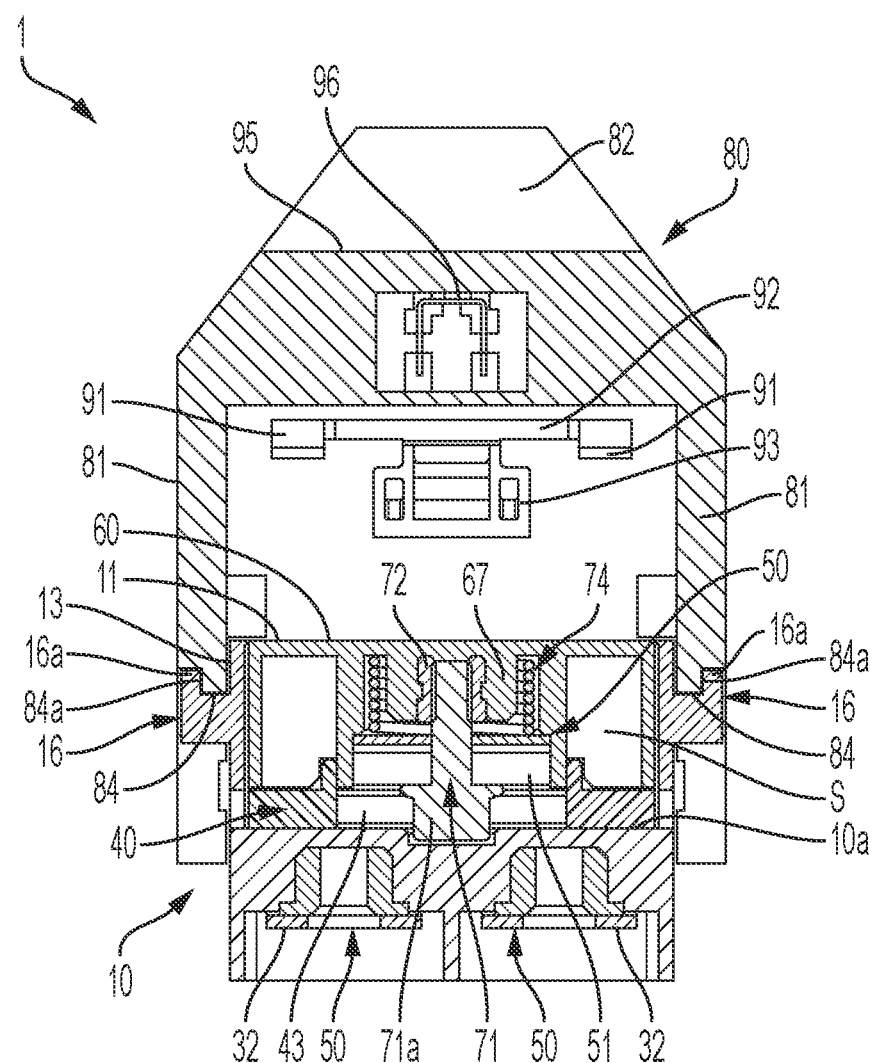
FIG. 5 is a sectional view taken on line B-B in FIG. 1A.

FIG. 3 is an exploded perspective view of the power circuit shut off device 1 according to the first embodiment. FIG. 4 is a sectional view taken on line A-A in FIG. 2. FIG. 5 is a sectional view taken on line B-B in FIG. 1A.

As shown in FIGS. 3 to 5, the housing 10 has a case 11 and a cover 60. The case 11 and the cover 60 are formed of a synthetic resin material having electric insulation. The case 11 has flange portions 12 bulging toward the outer circumference thereof. Bolt insertion holes 12a are formed in the flange portions 12. Bolts (not shown) inserted into the bolt insertion holes 12a are screwed down into bolt holes of a case of a power supply device or the like so that the housing 10 can be attached to the power supply device or the like.

The case 11 has a reception cylinder portion 13 opened on the upper side. The reception cylinder portion 13 is formed into an angular cylindrical shape which is rectangular in planar view. The reception cylinder portion 13 has a pair of side plate portions 14 and a pair of end plate portions 15. In each of the side plate portions 14 constituting the reception cylinder portion 13, a support shaft 16 is provided to protrude. In addition, a notch 17 is formed in each of the side plate portions 14. The notch 17 is formed into an L-shape having an insertion portion 18 formed in a vertical direction, and a slide portion 19 formed in a horizontal portion from a lower end of the insertion portion 18. In addition, closely to one end of each side plate portion 14 in the reception cylinder portion 13, a pair of main lock claws 21 protruding laterally are formed. Further, in the end plate portion 15 on one end side of the reception cylinder portion 13, a pair of sub-lock claws 22 are formed at the upper edge thereof. In addition, in the side plate portion 14 constituting the reception cylinder portion 13, locking claws 23 are formed in positions on their inner surface side and close to the four corners of the reception cylinder portion 13.

A terminal base 25 provided to stand up from the flange portion 12 is formed on one end side of the case 11, and a pair of sub-terminals 26 are provided on the terminal base 25. Signal lines 3 are connected to the sub-terminals 26. The sub-terminals 26 are inserted into the terminal base 25 from below the case 11 so as to be attached thereto.

A pair of terminals 30, an insulating plate (insulating movable member) 40 and an electric conductive plate (electric conductive member) 50 are assembled in the reception cylinder portion 13 of the case 11, and covered with the cover 60.

Each terminal 30 is formed into an approximately L-shape in planar view. Two terminals 30 are assembled in the reception cylinder portion 13. Each terminal 30 consists of a bus bar formed of an electrically conductive metal material such as copper or a copper alloy. The terminals 30 are subjected to a surface treatment such as tinning.

Each terminal 30 has an electric wire connection portion 32. A power line 2 extending from a power supply device or the like is connected to the electric wire connection portion 32. In addition, each terminal 30 has a terminal piece (contact point portion) 33 extending in a direction perpendicular to the electric wire connection portion 32. The terminal piece 33 is continuously connected to the electric wire connection portion 32 through a coupling portion 34. The terminal piece 33 is disposed above the electric wire connection portion 32. The terminal 30 is fixed to a bottom portion of the reception cylinder portion 13 by fastening a fastener 35 such as a nut to a bolt (not shown) inserted into a hole portion 4a of a connection terminal 4 at an end portion of the power line 2. When the terminals 30 are thus fixed to the bottom portion of the reception cylinder portion 13, the terminal pieces 33 are arranged at an interval along a bottom face 10a of the reception cylinder portion 13.

The insulating plate 40 is an insulating movable member formed out of a synthetic resin material (insulating material) having electric insulation. The insulating plate 40 is formed into a rectangular plate-like shape in planar view. Engagement pins 41 are provided to protrude in opposite side portions of the insulating plate 40. The insulating plate 40 is assembled inside the reception cylinder portion 13 while passing the engagement pins 41 through the insertion portions 18 of the notches 17 of the reception cylinder portion 13. When the insulating plate 40 is assembled inside the reception cylinder portion 13, end portions of the engagement pins 41 of the insulating plate 40 protrude from the outer surfaces of the side plate portions 14 of the reception cylinder portion 13.

In addition, when the insulating plate 40 is assembled inside the reception cylinder portion 13, the engagement pins 41 are allowed to move along the slide portions 19 of the notches 17. Thus, the insulating plate 40 is allowed to slide within the movable ranges of the engagement pins 41 inside the slide portions 19. Specifically, the insulating plate 40 is allowed to slide in a direction toward one end side of the case 11 and in a direction toward the other end side of the case 11 in a state where the insulating plate 40 is assembled inside the reception cylinder portion 13. The direction toward the one end side of the case 11 is referred to as a shutting off direction SA, and the direction toward the other end side of the case 11 is referred to as a conductive direction SB (see FIG. 4). A position where the insulating plate 40 slid in the shutting off direction SA is disposed on the one end side of the case 11 is referred to as a shut-off position, and a position where the insulating plate 40 slid in the conductive direction SB is disposed on the other end side of the case 11 is referred to as a conductive position.

A window portion 42 is formed at the center of the insulating plate 40 so as to penetrate the insulating plate 40 in the front/back direction thereof. One end side and the other end side of the insulating plate 40 putting the window portion 42 therebetween serve as shield portions 43 respectively. Guide faces 44 are formed at edge portions on the shutting off direction SA side in the shield portions 43 respectively. The guide faces 44 are made into slopes inclined upward toward the conductive direction SB side.

In addition, two guide walls 45 are formed on the upper face of the insulating plate 40 so as to extend in the sliding direction. The guide walls 45 are formed near opposite side portions of the insulating plate 40 putting the window portion 42 therebetween.

The electric conductive plate 50 is an electric conductive member formed into a plate-like shape which is rectangular in planar view. The electric conductive plate 50 consists of a bus bar formed out of an electrically conductive metal material such as copper or a copper alloy. The electric conductive plate 50 is subjected to a surface treatment such as tinning. The electric conductive plate 50 has contact pieces (contact point portions) 51 at opposite end parts thereof. The contact pieces SI are curved to protrude downward. Each contact pieces 51 has a protruding size larger than the thickness of the insulating plate 40.

The electric conductive plate 50 has a width smaller than the distance between the guide walls 45 of the insulating plate 40. The electric conductive plate 50 is disposed between the guide walls 45 from above the insulating plate 40.

In addition, a retention hole 52 is formed at the center of the electric conductive plate 50. A fixation bolt 71 is inserted into the retention hole 52 from below.

The cover 60 is formed into a box-like shape opened on the lower side. The cover 60 has an upper face plate portion 61, a pair of side face plate portions 62 and a pair of end face plate portions 63. When the cover 60 is viewed in plane, the cover 60 has an outer shape slightly smaller than the inner shape of the reception cylinder portion 13 of the case 11 so that the cover 60 can be fitted into the reception cylinder portion 13 from above so as to be assembled therein.

In each side face plate portion 62 of the cover 60, lock arms 65 are formed near opposite ends thereof. When the cover 60 is assembled in the reception cylinder portion 13, the lock arms 65 are locked to the locking claws 23. Thus, in the cover 60 assembled in the reception cylinder portion 13, the lock arms 65 are locked by the locking claws 23 so that the cover 60 is kept in the state where the cover 60 is assembled in the reception cylinder portion 13. In addition, in each side face plate portion 62 of the cover 60, a sealing protrusion 66 is formed closely to one end thereof. When the cover 60 is assembled in the reception cylinder portion 13, the sealing protrusion 66 is fitted to the insertion portion 18 of the corresponding notch 17 formed in the reception cylinder portion 13 so as to seal off the insertion portion 18. In this manner, the engagement pins 41 of the insulating plate 40 inserted into the notches 17 through the insertion portions 18 are prevented from dropping out from the notches 17.

In addition, the cover 60 has a nut fixation portion 67 and an annular retention wall 68 on the inner surface side of the upper face plate portion 61. The annular retention wall 68 is formed around the nut fixation portion 67 so as to secure a distance therefrom. A nut 72 is insert-molded in the nut fixation portion 67.

In the cover 60, a compression coil spring 74 is inserted into a gap between the nut fixation portion 67 and the annular retention wall 68 so as to be received and retained therein. In addition, the fixation bolt 71 inserted into the retention hole 52 of the electric conductive plate 50 from below is screwed down into the nut 72 fixed to the nut fixation portion 67. Thus, the electric conductive plate 50 is retained displaceably in a direction approaching the cover 60 against the elastic urging force of the compression coil spring 74.

When the cover 60 is assembled in the reception cylinder portion 13 of the case 11, a head portion 71a of the fixation bolt 71 fastened to the nut 72 of the nut fixation portion 67 of the cover 60 enters into the window portion 42 of the insulating plate 40. In this state, a head portion seat face of the head portion 71a of the fixation bolt 71 is disposed in a position flush with or slightly lower than the upper faces of the shield portions 43 of the insulating plate 40 (see FIG. 4).

In the aforementioned state where the lever 80 is disposed in the shut-off operation position so that the lever 80 can be removably attached to the housing 10, the insulating plate 40 is disposed in the shut-off position (see FIG. 1A). In this state, the shield portions 43 of the insulating plate 40 are put between the contact point portions to the terminal pieces 33 of the terminals 30 and the contact pieces 51 of the electric conductive plate 50 respectively, so that the pair of terminals 30 are brought into a non-conductive state to each other, and power lines 2 connected to the terminals 30 are brought into a disconnected state to each other. In the shut-off operation state, only the lever 80 can leave the housing 10 while the terminals 30 or the electric conductive plate 50 are still covered with the housing 10.

When the insulating plate 40 disposed in the shut-off position is slid in the conductive direction SB and disposed in the conductive position by the rotating operation of the lever 80, the shield portions 43 of the insulating plate 40 are extracted from between the contact point portions to the terminal pieces 33 of the terminals 30 and the contact pieces 51 of the electric conductive plate 50 respectively. Thus, the contact pieces 51 of the electric conductive plate 50 elastically urged in directions to touch the pair of terminals 30 respectively by the compression coil spring 74 touch the terminal pieces 33 of the terminals 30. In this manner, the pair of terminals 30 are brought into a conductive state to each other through the electric conductive plate 50, so that the power lines 2 connected to the terminals 30 respectively are electrically connected to each other.

In addition, when the insulating plate 40 disposed in the conductive position is slid in the shutting off direction SA and disposed in the shut-off position by the rotating operation of the lever 80, the shield portions 43 of the insulating plate 40 enter between the contact point portions to the terminal pieces 33 of the terminals 30 and the contact pieces 51 of the electric conductive plate 50 respectively so as to be put therebetween. In this manner, the pair of terminals 30 are brought into a non-conductive state to each other, so that the power lines 2 connected to the terminals 30 respectively are brought into an electrically disconnected state to each other. On this occasion, the electric conductive plate 50 can be displaced in a direction to approach the cover 60 against the elastic urging force of the compression coil spring 74 acting in a direction to approach the terminals 30. Thus, the insulating plate 40 can slide and move smoothly.

The lever 80 removably attached to the housing 10 is molded out of a synthetic resin material. The lever 80 is an approximately U-shaped lever including a pair of arm portions 81 and a coupling portion 82. The arm portions 81 are coupled with each other on their one side through the coupling portion 82. The arm portions 81 have bearing holes 84 respectively. The support shafts 16 formed in the case 11 of the housing 10 are inserted into the bearing holes 84 through the notch grooves so as to be engaged therewith. Thus, the lever 80 is attached to the housing 10 so that the lever 80 can be rotated around the axis of the support shafts 16.

In the front end portion of each support shaft 16, a locking piece 16a is formed so as to extend above the reception cylinder portion 13 crossing the axis. In addition, a locking recess portion 84a is recessed and provided at the opening edge of the bearing hole 84 in the outer surface of each arm portion 81. In the state where the lever 80 is not disposed in the shut-off operation position allowing the lever 80 to be removably attached to the housing 10, the locking piece 16a of the support shaft 16 inserted into the bearing hole 84 is engaged with the locking recess portion 84a to thereby prevent the arm portion 81 from dropping off.

Further, in the pair of arm portions 81 of the lever 80, cam grooves 85 are formed on the inner surface side respectively. When the lever 80 is attached to the housing 10, the engagement pins 41 assembled in the reception cylinder portion 13 movably within the ranges of the slide portions 19 of the notches 17 are engaged with the cam grooves 85.

When the lever 80 is operated to rotate between the shut-off operation position (see FIG. 1A) and the conductive operation position (see FIG. 1B), the engagement pins 41 engaged with the cam grooves 85 can be moved within the ranges of the slide portions 19. In this manner, the insulating plate 40 can be slid and moved within the reception cylinder portion 13.

As shown in FIG. 4, in the arm portions 81 of the lever 80, main lock step portions 86 are formed in parts close to the coupling portion 82. The main lock claws 21 formed in the reception cylinder portion 13 of the case 11 are engaged with the main lock step portions 86. Main lock portions MR are constituted by the main lock claws 21 and the main lock step portions 86 respectively (see FIG. 1A). In the main lock portions MR, in the state where the lever 80 is disposed in the conductive operation state, the main lock claws 21 are engaged with the main lock step portions 86 to lock the lever 80 to the housing 10 to thereby regulate the rotation of the lever 80. In the power circuit shut off device 1, the state where the lever 80 is disposed in the conductive operation position so as to be locked by the main lock portions MR is referred to as a conductive state (see FIG. 1B). In addition, in the power circuit shut off device 1, the state where the lever 80 is disposed in the shut-off operation position is referred to as a shut-off position (see FIG. 1A).

A sub-lock arm 92 including two sub-lock protrusion portions 91 is formed in the coupling portion 82 of the lever 80. In addition, a sub-lock release portion 93 is formed in the sub-lock arm 92.

The sub-lock protrusion portions 91 of the sub-lock arm 92 can be locked to the sub-lock claws 22 formed in the reception cylinder portion 13 of the case 11. Sub-lock portions SR are constituted by the sub-lock claws 22 and the sub-lock protrusion portions 91 (see FIG. 4). In the sub-lock portions SR, when the lever 80 is being rotated from the conductive operation position toward the shut-off operation position, the sub-lock protrusion portions 91 lock the sub-lock claws 22 to thereby regulate the rotation of the lever 80. The position where the lever 80 is locked by the sub-lock portions SR when the lever 80 is being rotated from the conductive operation position toward the shut-off operation position is referred to as a temporary shut-off operation position. In the power circuit shut off device 1, the state where the lever 80 is locked in the temporary shut-off operation position is referred to as a temporary shut-off state. In the temporary shut-off state, the sub-lock release portion 93 can be pushed to elastically deform the sub-lock arm 92 so as to release the sub-lock protrusion portions 91 from locking to the sub-lock claws 22. In this manner, the lever 80 locked in the temporary shut-off operation position can be rotated toward the shut-off operation position again.

In addition, a terminal retention portion 95 is formed in the coupling portion 82 of the lever 80. A short-circuit terminal 96 is retained in the terminal retention portion 95. The short-circuit terminal 96 includes a pair of tab portions 97. The pair of tab portions 97 of the short-circuit terminal 96 can be connected to the pair of sub-terminals 26 of the housing 10 respectively. When the pair of tab portions 97 of the short-circuit terminal 96 are connected to the pair of sub-terminals 26 respectively, the signal lines 3 connected to the pair of sub-terminals 26 respectively are electrically connected to each other through the short-circuit terminal 96.

In the power circuit shut off device 1, a main switch portion (switch portion) MSw is constituted by the terminal pieces 33 of the terminals 30, the shield portions 43 of the insulating plate 40, and the contact pieces 51 of the electric conductive plate 50, and a sub-switch portion SSw is constituted by the sub-terminals 26 and the short-circuit terminal 96 (see FIG. 4 and FIG. 5). The main switch portion MSw is received in a reception space S of the housing 10 consisting of a space surrounded by the case 11 and the cover 60.

In a power supply device or the like provided with the power circuit shut off device 1 according to the first embodiment, a power supply circuit is formed when the main switch portion MSw is turned on to electrically connect the pair of power lines 2 to each other, and a signal circuit is formed when the sub-switch portion SSw is turned on to electrically connect the pair of signal lines 3 to each other. In addition, the power supply device or the like provided with the power circuit shut off device 1 has a configuration in which even if the main switch portion MSw is tamed on to form the power supply circuit, the power supply circuit is not brought into a conductive state as long as the sub-switch portion SSw is not turned on to form the signal circuit. That is, the power supply circuit can be brought into a conductive state only when both the main switch portion MSw and the sub-switch portion SSw are turned on.

Next, operation of the power circuit shut off device 1 will be described.

Figure 6A:
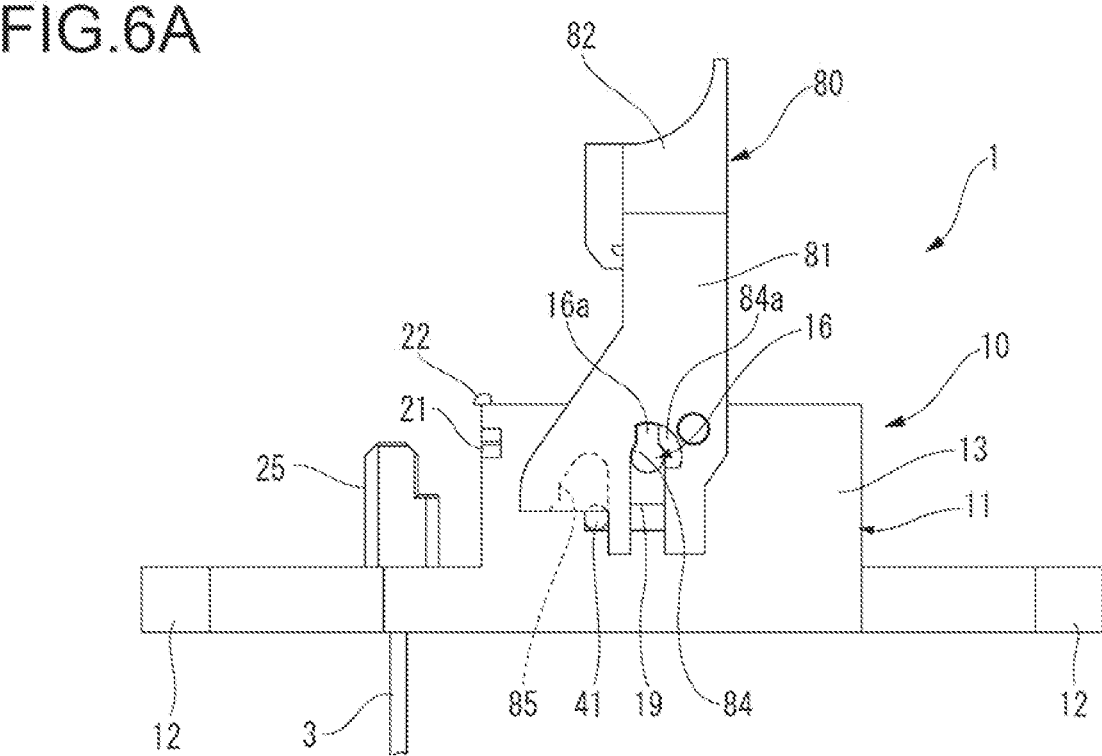
FIGS. 6A and 6B are views showing the shut-off state of the power circuit shut off device according to the first embodiment, FIG. 6A being a side view, FIG. 6B being a sectional view in a longitudinal direction.
Figure 6B:
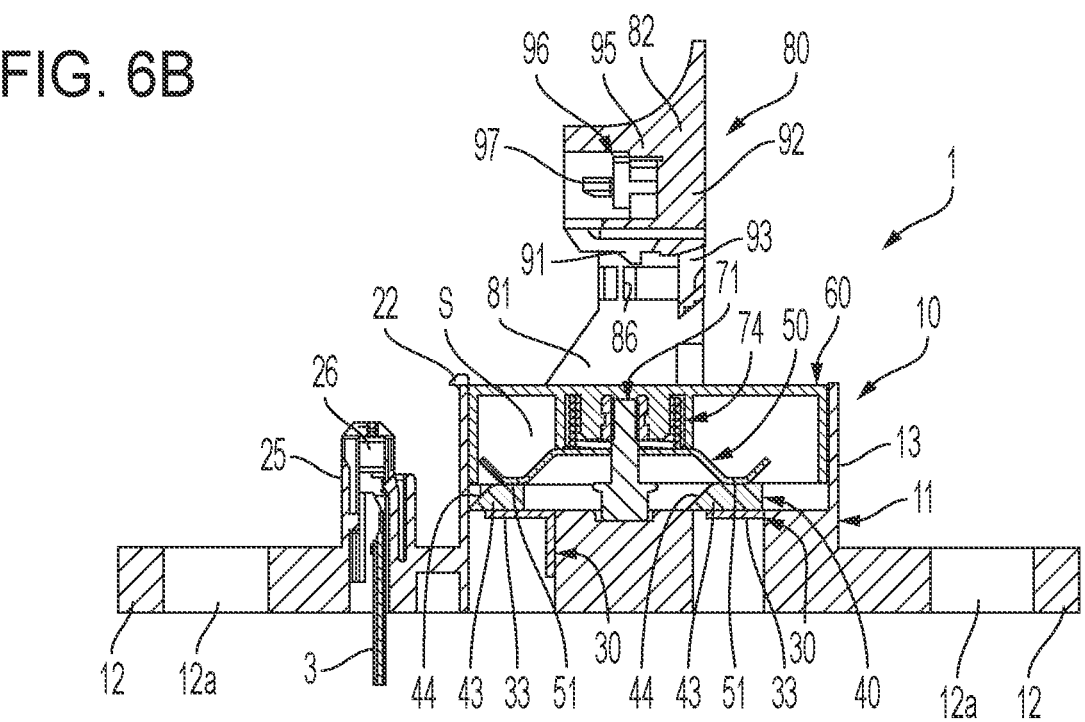
Figure 7A:
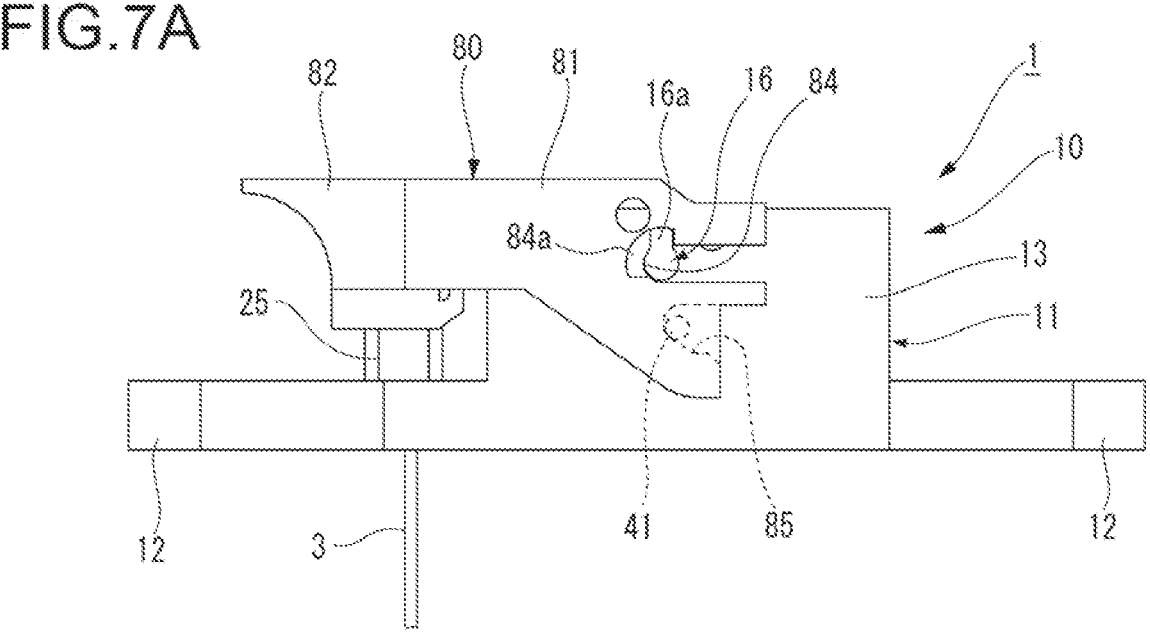
FIGS. 7A and 7B are views showing the conductive state of the power circuit shut off device according to the first embodiment, FIG. 7A being a side view, FIG. 7B being a sectional view in the longitudinal direction.
Figure 7B:
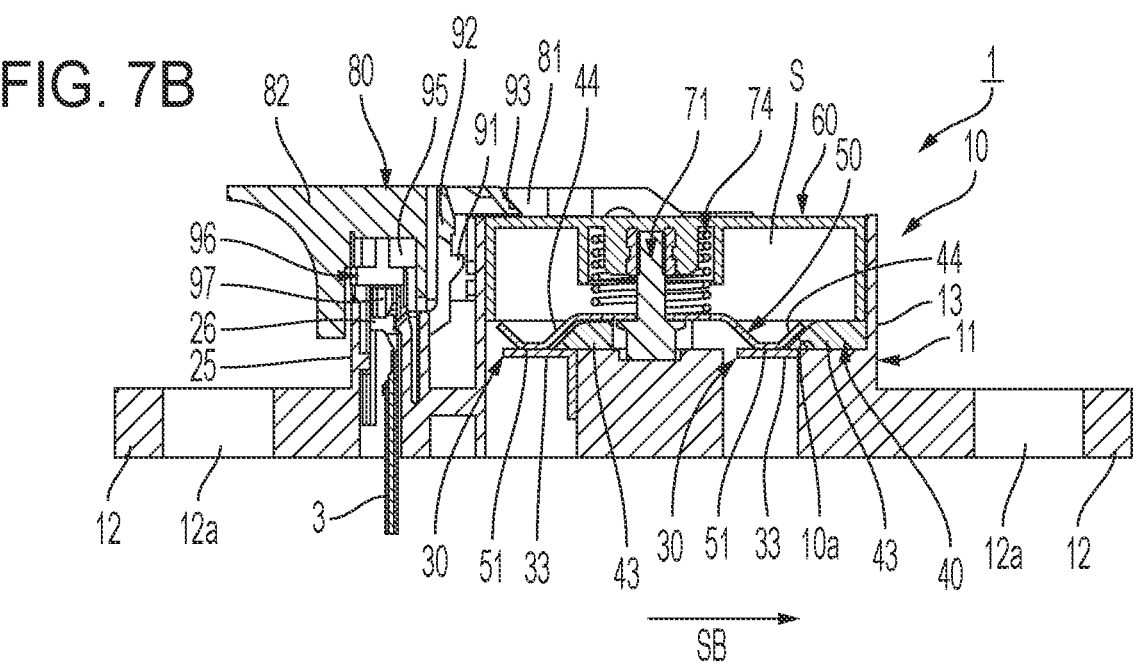
Figure 8A:
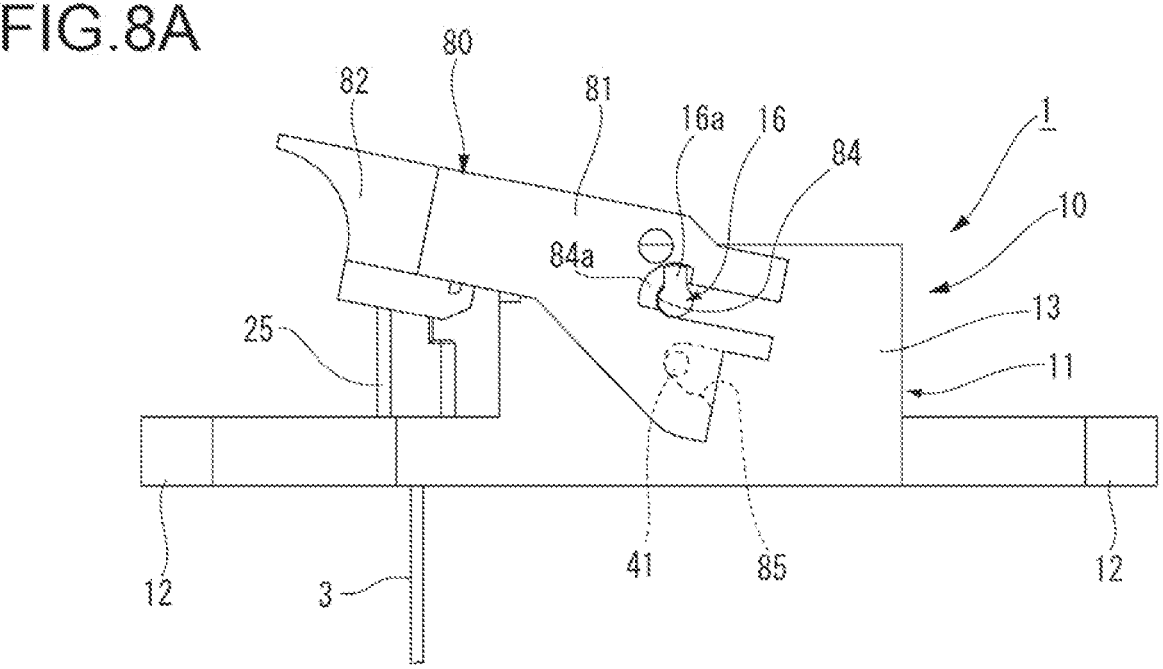
FIGS. 8A and 8B are views showing a temporary shut-off state of the power circuit shut off device according to the first embodiment, FIG. 8A being a side view, FIG. 8B being a sectional view in the longitudinal direction.
Figure 8B:
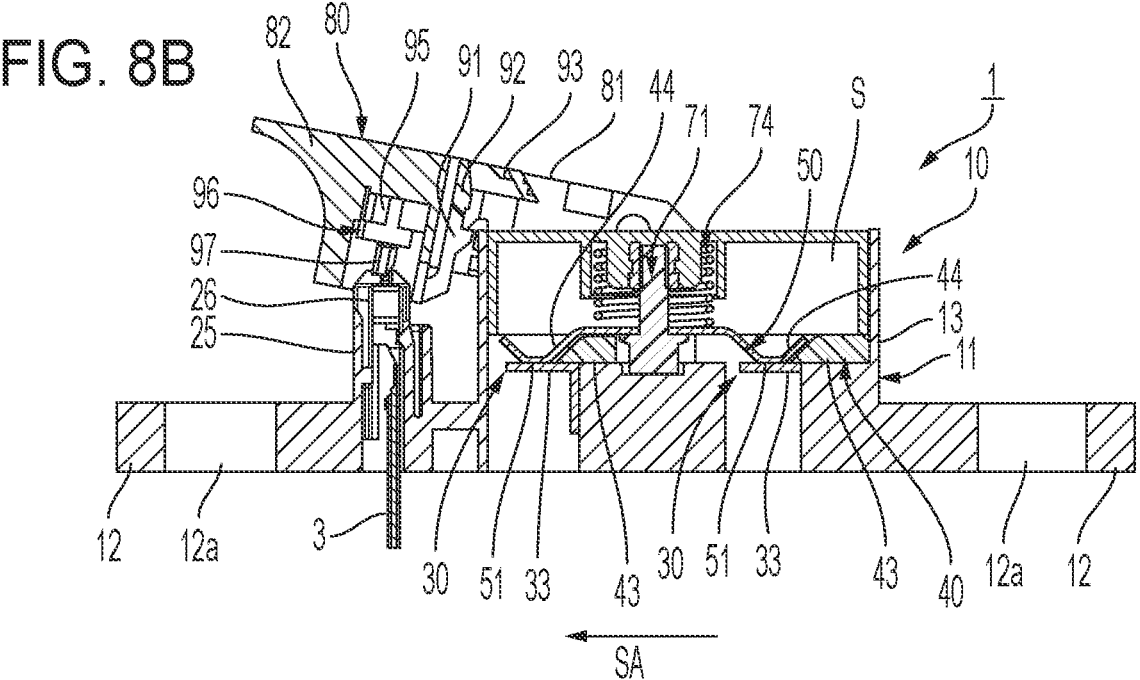

FIGS. 6A and 6B are views showing the shut-off state of the power circuit shut off device 1 according to the first embodiment. FIG. 6A is a side view, and FIG. 6B is a sectional view in a longitudinal direction. FIGS. 7A and 7B are views showing the conductive state of the power circuit shut off device 1 according to the first embodiment. FIG. 7A is a side view, and FIG. 7B is a sectional view in the longitudinal direction. FIGS. 8A and 8B are views showing the temporary shut-off state of the power circuit shut off device according to the first embodiment. FIG. 8A is a side view, and FIG. 8B is a sectional view in the longitudinal direction.

(Conductive Operation)

First, as shown in FIGS. 6A and 6B, the lever 80 is attached to the housing 10 in the shut-off state in which the insulating plate 40 has been disposed in the shut-off position. Specifically the notch grooves communicating with the bearing holes 84 of the arm portions 81 of the lever 80 are engaged with the support shafts 16 of the case 11 from above, and disposed in the shut-off operation position. Thus, the engagement pins 41 enter into the cam grooves 85 of the arm portions 81 of the lever 80.

Next, as shown in FIGS. 7A and 7B, the lever 80 is rotated toward the conductive operation position. Then the engagement pins 41 entering the cam grooves 85 are displaced along the slide portions 19 of the notches 17 so that the insulating plate 40 disposed in the shut-off position is slid and moved in the conductive direction SB. Thus, the insulating plate 40 is disposed in the conductive position to thereby establish the conductive state. Specifically, the shield portions 43 of the insulating plate 40 are extracted from between the contact point portions to the terminal pieces 33 of the terminals 30 and the contact pieces 51 of the electric conductive plate 50 respectively so that the contact pieces 51 touch the terminal pieces 33. That is, the main switch portion MSw is turned on so that electric conductive can be established between the pair of terminals 30 through the electric conductive plate 50. Thus, the power lines 2 connected to the terminals 30 respectively are electrically connected to each other. In addition, the tab portions 97 of the short-circuit terminal 96 are connected to the sub-terminals 26. That is, the sub-switch portion SSw is turned on so that the signal lines 3 connected to the sub-terminals 26 can be electrically connected to each other through the short-circuit terminal 96.

In addition, due to the change from the shut-off state to the conductive state, the main lock step portions 86 of the lever 80 are locked to the main lock claws 21 of the case 11 in the main lock portions MR. Thus, the lever 80 is locked in the state where the lever 80 is disposed in the conductive operation position, so that the rotation of the lever 80 is regulated. In this manner, in the conductive state, the conductive state can be kept by the main lock portions MR regulating the rotation of the lever 80.

(Shut-Off Operation)

The lever 80 disposed in the conductive operation position (see FIGS. 7A and 7B) is gripped and lifted up. Then the main lock step portions 86 of the lever 80 are detached from the main lock claws 21 of the case 11 so that the lever 80 can be released from locking by the main lock portions MR keeping the conductive state. Thus, the lever 80 is made rotatable.

The lever 80 made rotatable is rotated toward the shut-off operation position. As shown in FIG. 8, when the rotated lever 80 reaches the temporary shut-off operation position, the sub-lock protrusion portions 91 constituting the sub-lock portions SR lock the sub-lock claws 22 of the case 11 so that the lever 80 is locked in the temporary shut-off operation position. Thus, the rotation of the lever 80 is regulated. In this manner, the housing 10 is brought into the temporary shut-off state.

When the temporary shut-off state is established, the tab portions 97 of the short-circuit terminal 96 are extracted from the sub-terminals 26 respectively. That is, the sub-switch portion SSw is turned off to release the electric connection between the signal lines 3.

Incidentally, in the temporary shut-off state, the contact pieces 51 of the electric conductive plate 50 are brought into a continuous contact state to the terminal pieces 33 of the terminals 30. Thus, electric conductive is established between the pair of terminals 30. That is, the main switch portion MSw is continuously turned on so that electric connection is continuously established between the power lines 2 connected to the terminals 30.

In the temporary shut-off state, the sub-lock release portion 93 of the sub-lock portions SR is pushed to release the locking by the sub-lock portions SR. The lever 80 made rotatable thus is rotated toward the shut-off operation position again. Due to the rotation of the lever 80, the engagement pins 41 in the cam grooves 85 are displaced along the slide portions 19 of the notches 17 so that the insulating plate 40 disposed in the conductive position is slid and moved in the shutting off direction SA. In this manner, the insulating plate 40 is disposed in the shut-off position to thereby establish the shut-off state (see FIGS. 6A and 6B).

In this manner, when the insulating plate 40 is slid to the shut-off position in the temporary shut-off state to thereby establish the shut-off state, the shield portions 43 of the insulating plate 40 are put between the contact point portions to the terminal pieces 33 of the terminals 30 and the contact pieces 51 of the electric conductive plate 50 respectively, so that the contact pieces 51 are pushed up by the guide faces 44 of the shield portions 43. Thus, the contact pieces 51 are separated from the terminal pieces 33 of the terminals 30. The shield portions 43 of the insulating plate 40 are put between the contact point portions to the contact pieces 51 and the terminal pieces 33 respectively, so that the electric conductive between the pair of terminals 30 is released to turn off the main switch portion MSw. Thus, the electric connection state between the pair of power lines 2 is released.

In this manner, according to the power circuit shut off device 1 according to the first embodiment, the main switch portion MSw is turned on in the conductive state (the state shown in FIGS. 7A and 7B) where the lever 80 is disposed in the conductive operation position by the main lock portions MR, and in the temporary shut-off state (the state shown in FIGS. 8A and 8B) in which the lever 80 is disposed in the temporary shut-off operation position by the sub-lock portions SR. The main switch portion MSw is turned off in the shut-off state (the state shown in FIGS. 6A and 6B) where the lever 80 is disposed in the shut-off operation position.

In addition, the sub-switch portion SSw is turned on in the conductive state (the state shown in FIGS. 7A and 7B) where the lever 80 is disposed in the conductive operation position by the main lock portions MR. The sub-switch portion SSw is turned off in the temporary shut-off state (the state shown in FIGS. 8A and 8B) in which the lever 80 is disposed in the temporary shut-off operation position by the sub-lock portions SR, and in the shut-off state (the state shown in FIGS. 6A and 6B) where the lever 80 is disposed in the shut-off operation position.

Accordingly, after the sub-switch portion SSw is turned off to thereby release the electric connection state between the pair of signal lines 3, the main switch portion MSw cannot be turned off to thereby release the electric connection state between the pair of power lines 2 as long as the locking by the sub-lock portions SR is not released. In this manner, occurrence of an arc, a spark, etc. caused by a residual current generated by releasing the connection between the power lines 2 immediately after releasing the connection between the signal lines 3 can be inhibited.

As has been described above, according to the power circuit shut off device 1 according to the first embodiment, the insulating plate 40 is slid and moved by the lever 80 so that the shield portions 43 of the insulating plate 40 are inserted to or extracted from between the contact point portions to the terminal pieces 33 of the terminals 30 and the contact pieces 51 of the electric conductive plate 50 in contact with each other respectively to thereby turn on or off the main switch portion MSw. The insulating plate 40 whose shield portions 43 are inserted to or extracted from between the contact point portions to the terminal pieces 33 of the terminals 30 and the contact pieces 51 of the electric conductive plate 50 is made of a synthetic resin material which is an insulating material lower in hardness than the terminals or the electric conductive plate 50. Thus, the damage given to the terminals 30 and the electric conductive plate 50 when the insulating plate 40 is inserted to or extracted from between the contact point portions to the terminal pieces 33 and the contact pieces 51 can be suppressed to be as small as possible. In this manner, the surfaces of the terminal pieces 33 of the terminals 30 and the surfaces of the contact pieces 51 of the electric conductive plate 50 can be suppressed from being shaved, and generation of shaved metal powder can be suppressed, in comparison with a case where contact points of terminals or the like made of electrically conductive metal materials slide on each other. Particularly when the surfaces of the terminals 30 and the electric conductive plate 50 are subjected to a plating treatment, there can be inhibited such a problem that the plating is separated to expose a substrate, and the substrate is oxidized to increase electric resistance. Thus, the main switch portion MSw turning on/off the circuit can be inhibited from deteriorating, so that high reliability can be kept.

In addition, the power circuit shut off device 1 according to the first embodiment has a structure in which the insulating plate 40 is slid and moved in the array direction in which the terminal pieces 33 of the terminals 30 are arranged along the bottom face 10*a* of the housing 10, so that the main switch portion MSw is turned on/off. Accordingly, the power circuit shut off device 1 configured thus can be made smaller in size and lower in height than a power circuit shut off device having a background-art structure in which a first housing and a second housing move relatively to each other in a vertical direction so as to be fitted to and separated from each other to thereby turn on and off a switch portion.

In addition, according to the power circuit shut off device 1 according to the first embodiment, the main switch portion MSw is received in the reception space S sectionally formed and surrounded by the housing 10. Therefore, a user is inhibited from touching the terminals 30 or the electric conductive plate 50 which are conductive parts, so that safety can be secured. In this manner, in the power circuit shut off device 1 according to the first embodiment, a structure for preventing a finger from touching the conductive parts can be dispensed with. Thus, the power circuit shut off device 1 according to the first embodiment can be made lower in cost and smaller in size due to its simplified structure than a power circuit shut off device having a background-art structure in which a second housing is fitted to and separated from a first housing to thereby turn on and off a switch portion.

Further, according to the power circuit shut off device 1 according to the first embodiment, in the temporary shut-off state where the insulating plate 40 is being displaced from the conductive position to the shut-off position, the sub-switch portion SSw is turned off to shut off electric conduction to a circuit for the main switch portion MSw while the main switch portion MSw is still turned on. Therefore, the timing when the main switch portion MSw is turned off can be delayed relatively to the sub-switch portion SSw, so that an arc, a spark, etc. can be inhibited from being generated by a residual current in the circuit.

In addition, according to the power circuit shut off device 1 according to the first embodiment, the contact faces to the terminal pieces 33 of the terminals 30 and the contact pieces 51 of the electric conductive plate 50 are covered with the shield portions 43 of the insulating plate 40 in the shut-off state. Therefore, the contact faces in the contact point portions in the shut-off state are inhibited from being exposed, so that formation of an oxide coating or corrosion in the contact faces can be inhibited, in comparison with a background-art structure in which the terminals 30 and the electric conductive plate 50 are moved relatively to touch each other or leave each other. Thus, the reliability of the main switch portion MSw can be enhanced.

In addition, according to the power circuit shut off device 1 according to the first embodiment, the insulating plate 40 can be slid and moved easily with light operation force due to the rotation of the lever 80. Thus, the power circuit shut off device 1 more excellent in operability can be provided.

Figure 10:
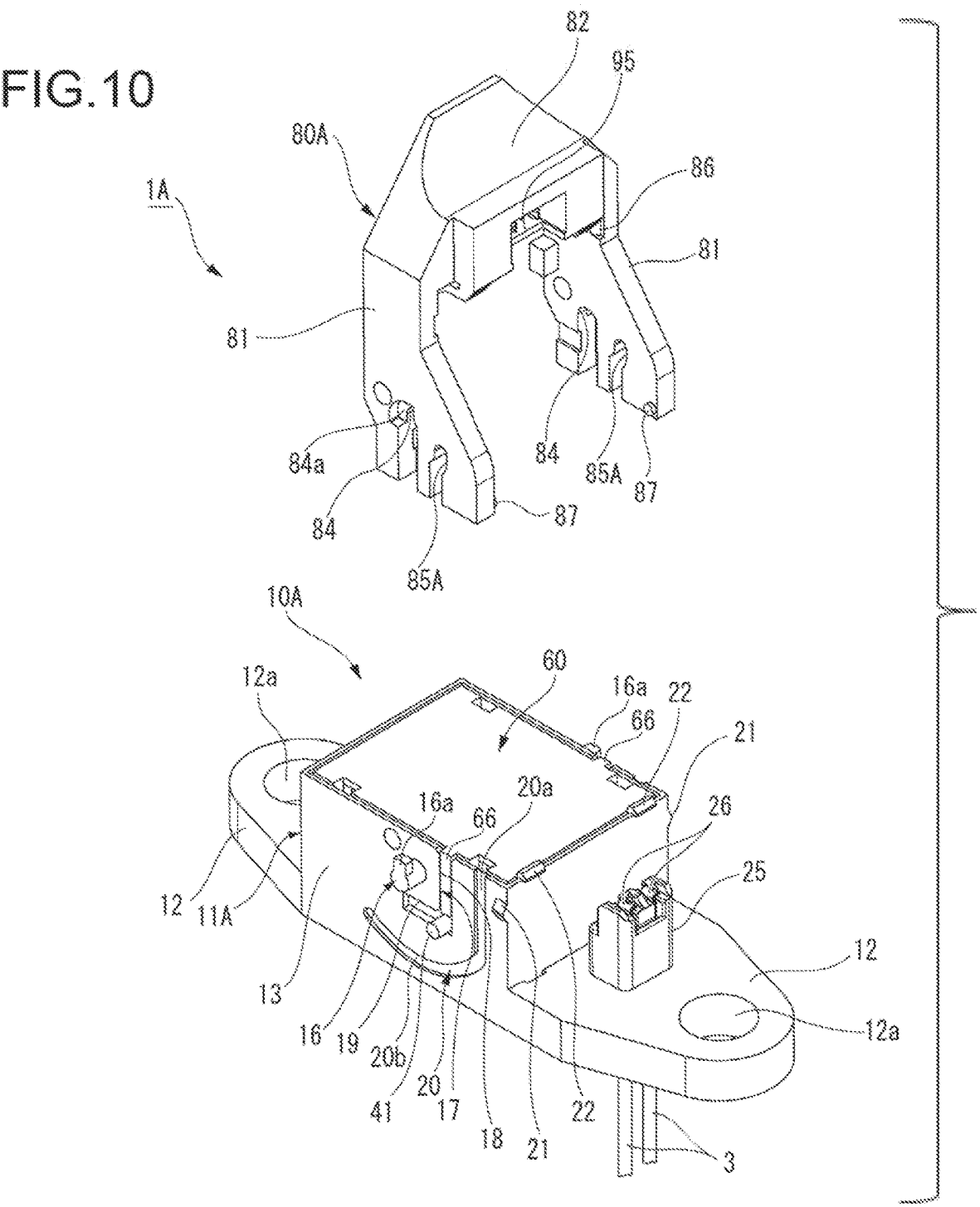
FIG. 10 is a perspective view showing a state in which a lever has been removed from a housing in the power circuit shut off device in the shut-off state shown in FIG. 9A.
Figure 11:
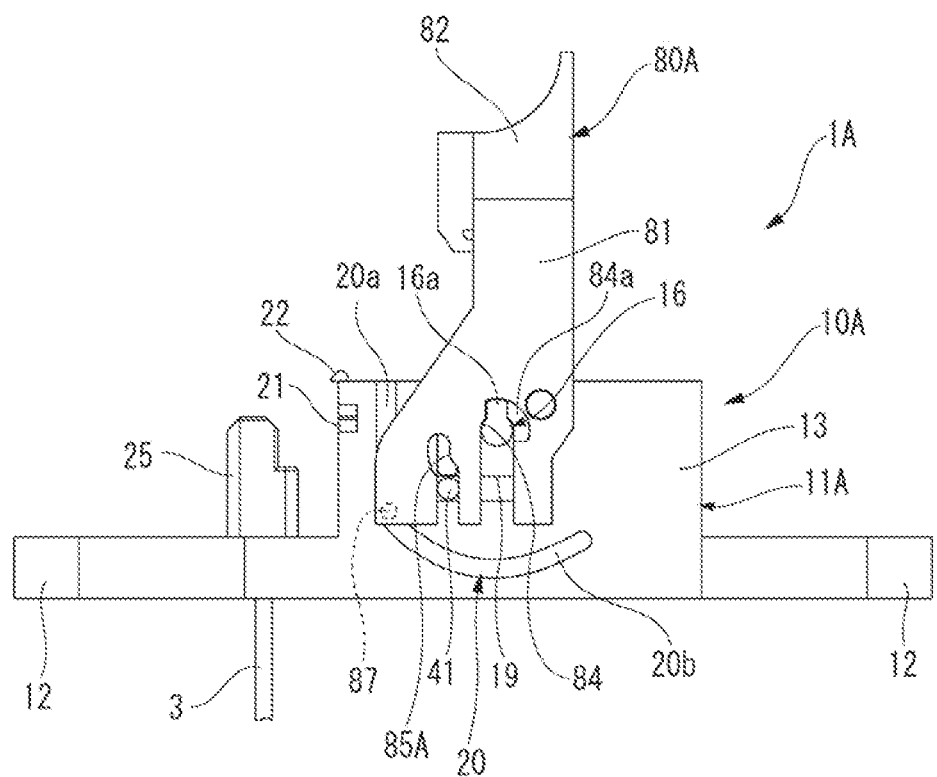
FIG. 11 is a side view showing the shut-off state of the power circuit shut off device according to the second embodiment.
Figure 12A:
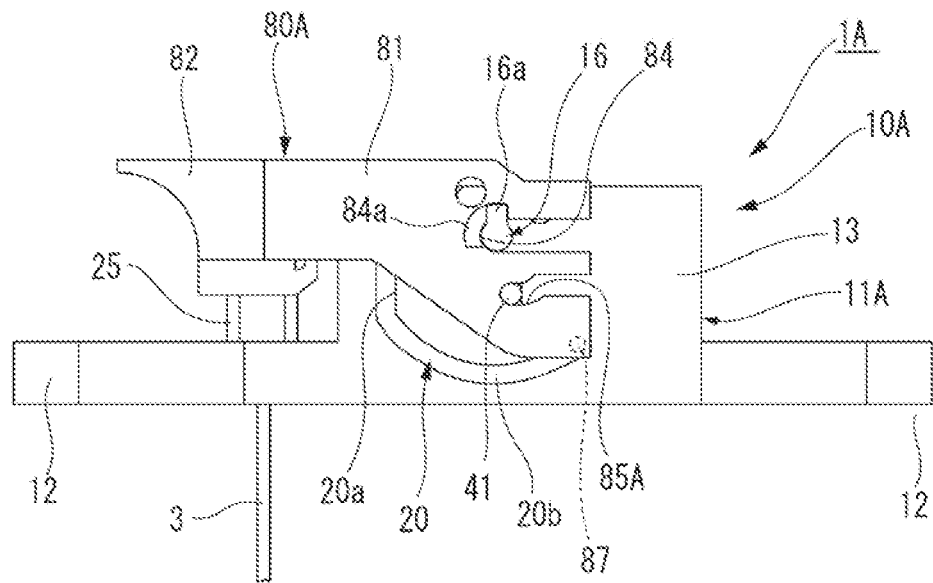
FIGS. 12A and 12B are side views showing the conductive state and a temporary shut-off state of the power circuit shut off device according to the second embodiment.
Figure 12B:
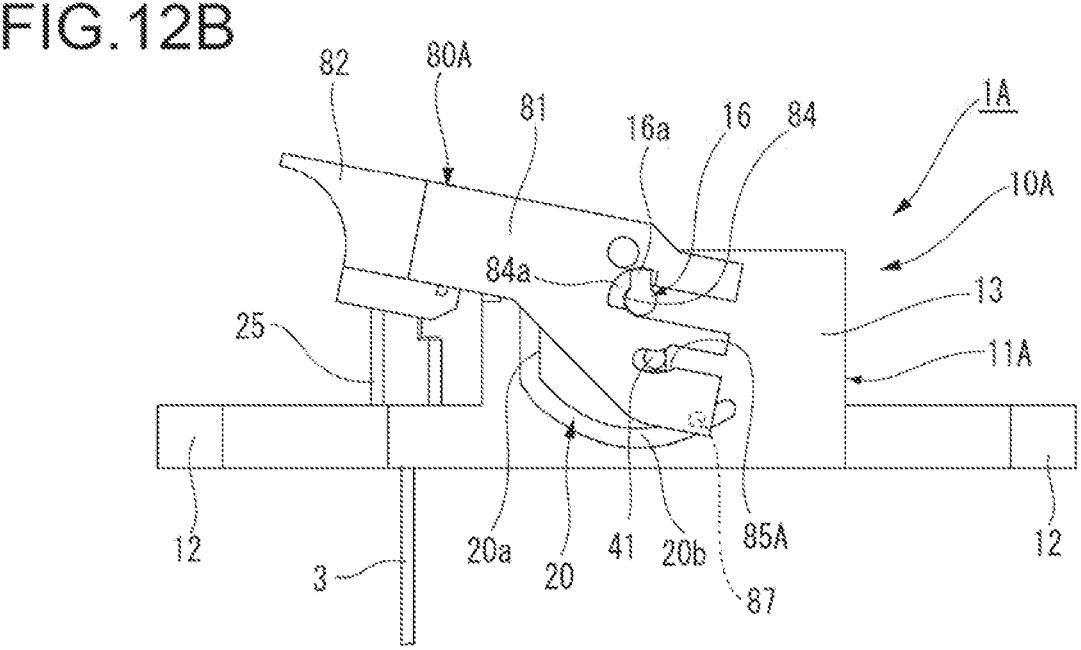

FIGS. 9A and 9B are views showing a power circuit shut off device 1A according to a second embodiment of the present invention. FIG. 9A is a perspective view in a shut-off state, and FIG. 9B is a perspective view in a conductive state. FIG. 10 is a perspective view showing a state in which a lever 80 has been removed from a housing 10 in the power circuit shut off device 1A in the shut-off state shown in FIG. 9A. FIG. 11 is a side view showing the shut-off state of the power circuit shut off device 1A according to the second embodiment. FIGS. 12A and 12B are side views showing the conductive state and a temporary shut-off state of the power circuit shut off device 1A according to the second embodiment.

Incidentally, constituent members of the power circuit shut off device 1A substantially the same as the constituent members of the power circuit shut off device 1 according to the first embodiment are referenced correspondingly, and their detailed description will be omitted.

As shown in FIG. 9 and FIG. 10, the power circuit shut off device A according to the second embodiment has a housing 10A and a lever (operating member) 80A.

The housing 10A has a case 11A and a cover 60. In a pair of side plate portions 14 constituting a reception cylinder portion 13 of the case 11A, support shafts 16 are provided to protrude while notches 17 are formed. Further, guide grooves 20 are formed on the outer surface sides of the pair of side plate portions 14. Each of the guide grooves 20 is formed into an approximately J-shape including an insertion groove 20*a* formed in a vertical direction, and an arc groove 20*b* extending in an arc shape in a horizontally direction from the lower end of the insertion groove 20*a*.

The lever 80A removably attached to the housing 10A is molded out of a synthetic resin material. The lever 80A is an approximately U-shaped lever including a pair of arm portions 81 and a coupling portion 82. The arm portions 81 have bearing holes 84 respectively. The support shafts 16 formed in the case 11A of the housing 10A are inserted into the bearing holes 84 through the notch grooves so as to be engaged therewith. Thus, the lever 80A is attached to the housing 10A so that the lever 80 can be rotated around the axis of the support shafts 16.

In the pair of arm portions 81 of the lever 80A according to the second embodiment, cam grooves 85A are formed. When the lever 80A is attached to the housing 10A, engagement pins 41 assembled in the reception cylinder portion 13 movably within the ranges of slide portions 19 of the notches 17 are engaged with the cam grooves 85A.

When the lever 80A is operated to rotate between a shut-off operation position (see FIG. 9A) and a conductive operation position (see FIG. 9B), the engagement pins 41 engaged with the cam grooves 85A can be moved within the ranges of the slide portions 19 in the same manner as the lever 80 according to the first embodiment. In this manner, the insulating plate 40 can be slid and moved within the reception cylinder portion 13. In addition, as shown in FIG. 10, the lever 80A can be removably attached to the housing 10A in a state where the lever 80A is disposed in the shut-off operation position.

Further, a lever detachment preventing mechanism allowing the lever 80A to leave the housing 10A only in the shut-off operation position is provided between the lever 80A and the housing 10A in the power circuit shut off device 1A according to the second embodiment.

The lever detachment preventing mechanism according to the second embodiment has guide protrusions 87 provided in the lever 80A, and guide grooves 20 provided in the housing 10A. When the guide grooves 20 are engaged with the guide protrusions 87, the lever 80A can leave the housing 10A only in the shut-off operation position.

As shown in FIG. 10, in the arm portions 81 of the lever 80A, guide protrusions 87 are formed on the inner surface side. The guide protrusions 87 are engaged with the guide grooves 20 formed in the pair of side plate portions 14 in the case 11A of the housing 10A.

That is, the insertion grooves 20a of the guide grooves 20 are grooves like straight lines parallel to the vertical moving locus of the lever 80A (an attachment/detachment locus of the lever) when the support shafts 16 formed in the case 11A are inserted from the notch grooves of the arm portions 81 so as to be engaged with bearing holes 84 in order for the lever 80A to be removably attached to the housing 10A.

In addition, the arc grooves 20b of the guide grooves 20 are arc-like grooves corresponding to arc-like moving loci (rotation loci) of the guide protrusions 87 provided to protrude on the arm portions 81 when the lever 80A is operated to rotate around the axis of the support shafts 16.

Accordingly, as shown in FIG. 11, in a state where the lever 80A is disposed in a shut-off operation position, the guide protrusions 87 of the lever 80A are located in the insertion grooves 20a of the guide grooves 20 parallel to the notch grooves communicating with the bearing holes 84 of the arm portions 81 so that the lever 80A can move in the vertical direction along the notch grooves of the arm portions 81. Thus, the lever 80A can be removably attached to the housing 10A.

As shown in FIG. 12A, in a state where the lever 80A is disposed in a conductive operation position, the guide protrusions 87 of the lever 80A are located in the arc grooves 20b of the guide grooves 20 so as to regulate the movement of the lever 80A in a direction to leave the housing 10A along the notch grooves of the arm portions 81. Thus, the lever 80A is not allowed to leave the housing 10A, so that the lever 80A is prevented from dropping off unintentionally. In addition, as shown in FIG. 12B, even in a state where the lever 80A is disposed in a temporary shut-off operation position, the guide protrusions 87 of the lever 80A are located in the arc grooves 20b of the guide grooves 20. Therefore, the lever 80A is regulated from moving in the direction to leave the housing 10A along the notch grooves of the arm portions 81, so that the lever 80A cannot be removed from or attached to the housing 10A. Thus, the lever 80A can be prevented from unintentionally dropping off.

Further, in the power circuit shut off device 1A according to the second embodiment, a conductive state is established in a state where the lever 80A is disposed in the conductive operation position and locked by main lock portion MR (see FIG. 9B). In addition, in the power circuit shut off device 1A, a shut-off state is established in a state where the lever 80A is disposed in the shut-off operation position (see FIG. 9A). That is, the operation of the power circuit shut off device 1A according to the second embodiment is similar to the operation of the power circuit shut off device 1 according to the first embodiment. Accordingly, the power circuit shut off device 1A according to the second embodiment can keep high reliability in connection between terminals electrically connected to each other, and can reduce the size and height thereof while suppressing the cost in the same manner as the power circuit shut off device 1 according to the first embodiment.

In addition, in the power circuit shut off device 1A according to the second embodiment, a lever detachment preventing mechanism that permits the lever 80A to leave the housing 10A only in the shut-off operation position is provided. Therefore, the lever 80A rotated between the shut-off operation position and the conductive operation position relatively to the housing 10A can be attached to and detached from the housing 10A. Thus, in the shut-off operation position, only the lever 80A can leave the housing 10A while the terminals 30 and the electric conductive plate 50 are still covered with the housing 10A. Thus, a structure provided in the first housing in the background-art power circuit shut off device in order to prevent a finger from touching the female terminal of the first housing exposed when the second housing is detached can be dispensed with. In addition, there is no fear that the lever 80A may be detached unintentionally during rotational operation in any other position than the shut-off operation position.

In addition, according to the power circuit shut off device 1A according to the second embodiment, the lever detachment preventing mechanism can be constituted by the simple structure in which the guide protrusions 87 and the guide grooves 20 corresponding to moving loci of the guide protrusions 87 (an attachment/detachment locus and a rotating locus of the lever 80A) are provided in the lever 80A and the housing 10A respectively.

Incidentally, the present invention is not limited to the aforementioned embodiments, but deformations, improvements, etc. can be made suitably. In addition, materials, shapes, dimensions, numbers, arrangement places, etc. of respective constituent elements in the aforementioned embodiments are not limited. Any materials, any shapes, any dimensions, any numbers, any arrangement places, etc. may be used as long as the invention can be attained.

For example, in each of the power circuit shut off devices 1 and 1A according to the aforementioned embodiments, the approximately U-shaped lever 80, 80A which can be rotated relatively to the housing 10 is provided as an operating member. However, based on the gist of the present invention, it is a matter of course that various forms can be used as the configurations of the operating member and the insulating movable member (insulating plate 40) as long as they are mechanisms capable of moving the insulating movable member in the array direction of a pair of terminals.

Incidentally, in each of the power circuit shut off devices 1 and 1A according to the aforementioned embodiments, the compression coil spring 74 is provided as an elastic member for urging the electric conductive plate 50 as an electric conductive member toward the terminals 30 to thereby press the contact pieces 51 onto the terminal pieces 33. However, the power circuit shut off device according to the present invention is not limited to the structure in which the compression coil spring 74 is provided. For example, a structure in which the contact pieces 51 are pressed onto the terminal pieces 33 by the elastic force of the electric conductive plate 50 itself may be used as long as a stroke for bending the contact pieces 51 can be sufficiently secured. In this configuration, the elastic member as a separate body may be omitted.

In addition, in order to prepare for a case where the power circuit shut off device 1, 1A cannot be operated due to accidental damage or the like on the lever 80, 80A, the insulating plate 40 may be urged, by an elastic member such as a spring, in the shutting off direction SA in which the main switch portion MSw will be turned off.

Further, in the power circuit shut off device 1A according to the second embodiment, the lever detachment preventing mechanism is constituted by the guide protrusions 87 provided in the lever 80A, and the guide grooves 20 provided in the housing 10A. However, the lever detachment preventing mechanism according to the present invention is not limited thereto. It will go well if a guide protrusion provided in one of a lever or a housing, and a guide groove provided in the other of the lever and the housing are provided between the lever and the housing.

Here, the features of the aforementioned embodiments of the power circuit shut off devices according to the invention will be summarized and listed briefly in the following paragraphs [1] to [7].

[1] There is provided a power circuit shut off device (1, 1A) including:
 a housing (10, 10A);
 a switch portion (main switch portion MSw) that is provided in the housing (10, 10A); and
 an operating member (lever 80, 80A) configured to turn on or turns off the switch portion (main switch portion MSw),
 in which the switch portion (main switch portion MSw) including:
  a pair of terminals (terminals 30) arranged along a bottom face (10a) of the housing (10, 10A);
  an electric conductive member (electric conductive plate 50) having contact point portions (contact pieces 51) and that is elastically urged towards the pair of terminals (30), the pair of terminals (30) being brought into electric conductive to each other when the pair of terminals contact the contact point portions respectively; and
  an insulating movable member (insulating plate 40) configured to move along a direction in which the pair of terminals (30) are arranged, and that is made of insulating material;
 in which the insulating movable member (insulating plate 40) is moved by an operation on the operating member (lever 80, 80A), between a shut-off position, the insulating movable member (insulating plate 40) in the shut-off position being put between the contact point portions of the electric conductive member (electric conductive plate 50) and the terminals (30) so as to turn off the switch portion (main switch portion MSw), and the insulating movable member (insulating plate 40) in the conductive position being released from between the contact point portions of the electric conductive member and the terminals so as to turn on the switch portion (main switch portion MSw)

[2] For example, in the power circuit shut off device (1, 1A) according to the aforementioned paragraph [1], the switch portion (main switch portion MSw) is received in a reception space (S) sectionally formed and surrounded by the housing (10, 10A).

[3] For example, the power circuit shut off device (1, 1A) according to the aforementioned paragraph [1] or [2], further includes:
 a sub-switch portion (SSw) that is turned on together with the switch portion (main switch portion MSw) in a conductive state in which the insulating movable member (insulating plate 40) is disposed in the conductive position, and turned off to shut off electric conduction to a circuit for the switch portion (main switch portion MSw) in a temporary shut-off state in which the switch portion (main switch portion MSw) is kept on when the insulating movable member (insulating plate 40) is being displaced toward the shut-off position.

[4] For example, in the power circuit shut off device (1, 1A) according to any one of the aforementioned paragraphs [1] through [3], contact faces of the terminals (30) and the electric conductive member (electric conductive plate 50) are covered with the insulating movable member (insulating plate 40) disposed in the shut-off position.

[5] For example, in the power circuit shut off device (1, 1A) according to any one of the aforementioned paragraphs [1] through [4], the operating member includes a lever (80, 80A) that is rotatably attached to the housing (10, 10A); and the insulating movable member (insulating plate 40) is moved by rotating force of the lever (80, 80A).

[6] For example, the power circuit shut off device (1A) according to the aforementioned paragraph [5], further includes:
 a lever detachment preventing mechanism that is provided between the lever (80A) and the housing (10A) so as to permit the lever (80A) to leave the housing (10A) only in a shut-off operation position of the lever corresponding to the shut-off position.

[7] For example, in the power circuit shut off device (1A) according to the aforementioned paragraph [6], the lever detachment preventing mechanism includes:
 a guide protrusion (87) provided on one of the lever (80A) and the housing (10A); and
 a guide groove (20) provided on the other of the lever (80A) and the housing (10A) so that the guide groove (20) can engage with the guide protrusion (87) to allow the lever (80A) to leave the housing (10A) only in the shut-off operation position.

What is claimed is:
1. A power circuit shut off device comprising:
 a housing;

a switch portion that is provided in the housing; and
an operating member configured to turn on or turns off the switch portion,
wherein the switch portion comprising:
  a pair of terminals arranged along a bottom face of the housing;
  an electric conductive member having contact point portions and that is elastically urged toward the pair of terminals, wherein the pair of terminals are brought into electric conductive to each other when the pair of terminals contact the contact point portions respectively; and
  an insulating movable member configured to move along a direction in which the pair of terminals are arranged, and that is made of insulating material;
wherein the insulating movable member is moved between a shut-off position and a conductive position by an operation on the operating member, the insulating movable member in the shut-off position being put between the contact point portions of the electric conductive member and the terminals so as to turn off the switch portion, and the insulating movable member in the conductive position being released from between the contact point portions of the electric conductive member and the terminals so as to turn on the switch portion; and
wherein the insulating movable member is elastically urged toward the pair of terminals at both of the shut-off position and the conductive position.

2. The power circuit shut off device according to claim 1, wherein the switch portion is received in a reception space sectionally formed and surrounded by the housing.

3. The power circuit shut off device according to claim 1, further comprising:
  a sub-switch portion that is turned on together with the switch portion in a conductive state in which the insulating movable member is disposed in the conductive position, and is turned off to shut off electric conduction to a circuit of the switch portion in a temporary shut-off state in which the switch portion is kept on when the insulating movable member is being displaced toward the shut-off position.

4. The power circuit shut off device according to claim 1, wherein contact faces of the terminals and the electric conductive member are covered with the insulating movable member disposed in the shut-off position.

5. The power circuit shut off device according to claim 1, wherein the operating member includes a lever that is rotatably attached to the housing; and
  wherein the insulating movable member is moved by rotating force of the lever.

6. The power circuit shut off device according to claim 5, further comprising:
  a lever detachment preventing mechanism that is provided between the lever and the housing so as to allow the lever to leave the housing only in a shut-off operation position of the lever corresponding to the shut-off position.

7. The power circuit shut off device according to claim 6, the lever detachment preventing mechanism comprising:
  a guide protrusion provided on one of the lever and the housing; and
  a guide groove provided on the other of the lever and the housing so that the guide groove can engage with the guide protrusion to allow the lever to leave the housing only in the shut-off operation position.

* * * * *